United States Patent
Chung

(10) Patent No.: US 11,500,531 B2
(45) Date of Patent: Nov. 15, 2022

(54) METHOD FOR CONTROLLING EDIT USER INTERFACE OF MOVING PICTURE FOR DETAIL ADJUSTMENT CONTROL AND APPARATUS FOR THE SAME

(71) Applicant: KineMaster Corporation, Seoul (KR)

(72) Inventor: Jae Won Chung, Seoul (KR)

(73) Assignee: Kinemaster Corporation, Seoul (KR)

( * ) Notice: Subject to any disclaimer, the term of this patent is extended or adjusted under 35 U.S.C. 154(b) by 0 days.

(21) Appl. No.: 17/086,419

(22) Filed: Nov. 1, 2020

(65) Prior Publication Data

US 2021/0132783 A1    May 6, 2021

(30) Foreign Application Priority Data

Nov. 1, 2019 (KR) .................. 10-2019-0138781

(51) Int. Cl.
  *G06F 3/04847* (2022.01)
  *G06F 3/0488* (2022.01)
  *G06F 3/0482* (2013.01)
  *G06F 3/04886* (2022.01)
  *G11B 27/031* (2006.01)

(52) U.S. Cl.
  CPC ........ *G06F 3/04847* (2013.01); *G06F 3/0482* (2013.01); *G06F 3/0488* (2013.01); *G06F 3/04886* (2013.01); *G11B 27/031* (2013.01)

(58) Field of Classification Search
  CPC ............. G06F 3/04847; G06F 3/04886; G06F 3/0482; G06F 3/0488; G11B 27/031
  See application file for complete search history.

(56) References Cited

U.S. PATENT DOCUMENTS

| | | | |
|---|---|---|---|
| 6,542,692 B1 * | 4/2003 | Houskeeper | G11B 27/034 386/278 |
| 6,922,816 B1 * | 7/2005 | Amin | G06F 3/04847 715/732 |
| 7,080,324 B1 * | 7/2006 | Nelson | G06F 3/04847 715/771 |
| 9,594,492 B1 * | 3/2017 | Reed | G06F 3/04886 |

(Continued)

FOREIGN PATENT DOCUMENTS

| KR | 10-2012-0001516 A | 1/2012 |
|---|---|---|
| KR | 10-2018-0003012 A | 1/2018 |
| KR | 10-2018-0129265 A | 12/2018 |

*Primary Examiner* — Nicholas Ulrich
(74) *Attorney, Agent, or Firm* — McDonnell Boehnen Hulbert & Berghoff LLP

(57) ABSTRACT

An example video editing UI control apparatus includes: an editing UI display unit; a user input confirmation unit; and an editing UI processing unit. The editing UI display unit visualizes and displays an editing UI comprising a main editing UI and a detailed adjustment UI on a display device. The detailed adjustment UI is displayed by including first and second buttons with a fixed form. The user input confirmation unit confirms user input information based on a user input that is provided as a touch input through the display device. The editing UI processing unit confirms a main editing input value based on the user input information provided by the user input confirmation unit, sets a detailed adjustment input value of the detailed adjustment UI by considering the confirmed main editing input value, and processes an input of the detailed adjustment UI based on the set detailed adjustment input value.

17 Claims, 28 Drawing Sheets

(56) References Cited

U.S. PATENT DOCUMENTS

2012/0280922 A1* 11/2012 Lee .................... G06F 3/04855
　　　　　　　　　　　　　　　　　　　　　345/173
2015/0277718 A1* 10/2015 Lauer ................. G06F 3/04855
　　　　　　　　　　　　　　　　　　　　　715/780

* cited by examiner

METHOD FOR CONTROLLING EDIT USER INTERFACE OF MOVING PICTURE FOR DETAIL ADJUSTMENT CONTROL AND APPARATUS FOR THE SAME

CROSS REFERENCE TO RELATED APPLICATION

The present application claims priority to Korean Patent Application No. 10-2019-0138781, filed Nov. 1, 2019, the entire contents of which are incorporated herein for all purposes by this reference.

BACKGROUND OF THE INVENTION

Field of the Invention

The present disclosure relates to a method and apparatus for controlling a user interface, and more particularly, to a method and apparatus for providing and controlling a user interface used for video editing.

Description of the Related Art

Recently, portable terminals such as smart phones and tablets are widely used, and the performance advances of such portable terminals and the development of wireless communication technology allow users to shoot, edit, and share videos using portable terminals.

However, due to limitations in LCD size and hardware performance, users cannot edit videos by using a portable terminal as smoothly as in the general PC environment. In order to alleviate such inconvenience, user demand for a video editing method that can be used in a portable terminal is increasing.

In addition, as the needs of users of portable terminals are on the rise, the performance of camera, display and other hardware in portable terminals are being advanced, and many functions or services that used to be available only in the PC environment have been replaced by portable terminals. Particularly, as each portable terminal has a camera as a basic component, the needs of users for editing images or videos shot by cameras are increasing.

SUMMARY OF THE INVENTION

Although video editing technology has been diffused to use only limited functions due to the resource characteristics of portable terminals, the users' demand for video editing increases up to a level comparable to the PC environment.

Meanwhile, when editing a video using a mouse, a keyboard or other input devices in the PC environment, a user's action to operate an input device is required. However, as such an input device does not operate as smoothly as desired, the user's convenience is degraded, which is a problem.

A portable terminal is generally equipped with a display supporting touch input. When processing a user's input through a display supporting touch input, the user's input may be processed more intuitively and the user's convenience may be significantly improved.

In view of the foregoing description, one technical object of the present disclosure is to provide an editing UI control method and apparatus that may intuitively process various functions for video editing.

Another technical object of the present disclosure is to provide an editing UI control method and apparatus that may efficiently process a detailed adjustment user interface (UI) supporting fine adjustment during a video editing process.

Another technical object of the present disclosure is to provide an editing UI control method and apparatus that provide a detail adjustment UI having a simplified structure and design.

The technical objects of the present disclosure are not limited to the above-mentioned technical objects, and other technical objects that are not mentioned will be clearly understood by those skilled in the art through the following descriptions.

According to one aspect of the present disclosure, a video editing UI control apparatus may be provided. The apparatus may include an editing UI display unit, a user input confirmation unit and an editing UI processing unit. The editing UI display unit visually displays an editing UI including a main editing UI and a detailed adjustment UI on a display device. Herein, the detailed adjustment UI is displayed with first and second buttons with a fixed form. The user input confirmation unit confirms user input information based on a user input that is input through a touch and is provided through the display device. The editing UI processing unit confirms a main editing input value, which is input through the main editing UI, based on the user input information provided by the user input confirmation unit, sets a detailed adjustment input value of the detailed adjustment UI by considering the confirmed main editing input value, and processes an input of the detailed adjustment UI based on the set detailed adjustment input value.

According to another aspect of the present disclosure, a video editing UI control method may be provided. The method may include: displaying visually an editing UI including a main editing UI and a detailed adjustment UI in a display device and the detailed adjustment UI with first and second buttons with a fixed form; confirming user input information based on a user input that is input through a touch and is provided through the display device; confirming a main editing input value, which is input through the main editing UI, based on the user input information provided by the user input confirmation unit, and setting a detailed adjustment input value of the detailed adjustment UI by considering the confirmed main editing input value; and processing, based on the set detailed adjustment input value, an input of the detailed adjustment UI corresponding to the user input information.

The features briefly summarized above with respect to the present disclosure are merely exemplary aspects of the detailed description below of the present disclosure, and do not limit the scope of the present disclosure.

According to the present disclosure, a video editing UI control method and apparatus may be provided which provide a relatively simplified detailed adjustment UI.

Also, according to the present disclosure, a video editing UI control method and apparatus may be provided which may perform detailed adjustment by configuring a simplified detailed adjustment UI, instead of configuring different detailed adjustment UIs with a complicated structure for different adjustment targets or configuring and storing various detailed adjustment UIs with designs tailored to each adjustment target.

Also, according to the present disclosure, a video editing UI control method and apparatus may be provided which may realize a detailed adjustment UI with a simplified structure and low capacity and thus provide an environment in which a resource of a portable electronic device is efficiently used and an editing work is smoothly done.

Also, according to the present disclosure, a video editing UI control method and apparatus may be provided which may significantly improve a user's convenience by easily inputting and processing fine adjustment in a portable electronic device equipped with a display having a limited size.

Effects obtained in the present disclosure are not limited to the above-mentioned effects, and other effects not mentioned above may be clearly understood by those skilled in the art from the following description.

DETAILED DESCRIPTION OF THE INVENTION

Figure 1:
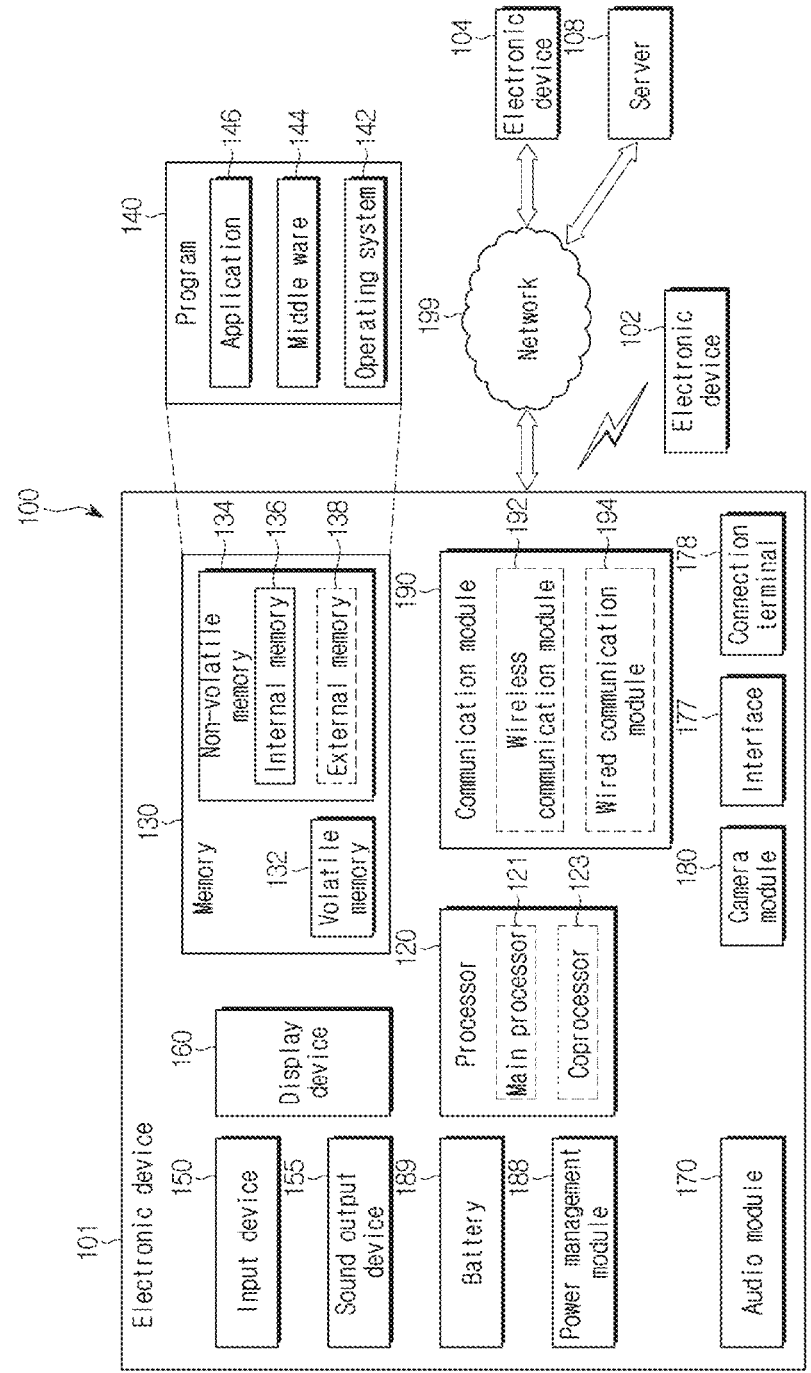
FIG. 1 a view exemplifying an electronic device to which various embodiments of the present disclosure are applied.

Hereinbelow, exemplary embodiments of the present disclosure will be described in detail with reference to the accompanying drawings such that the present disclosure can be easily embodied by one of ordinary skill in the art to which this invention belongs. However, the present disclosure may be variously embodied without being limited to the exemplary embodiments.

In the description of the present disclosure, the detailed descriptions of known constitutions or functions thereof may be omitted if they make the gist of the present disclosure unclear. Also, portions that are not related to the present disclosure are omitted in the drawings, and like reference numerals designate like elements.

In the present disclosure, when an element is referred to as being "coupled to", "combined with", or "connected to" another element, it may be connected directly to, combined directly with, or coupled directly to another element or be connected to, combined directly with, or coupled to another element, having the other element intervening therebetween. Also, it should be understood that when a component "includes" or "has" an element, unless there is another opposite description thereto, the component does not exclude another element but may further include the other element.

In the present disclosure, the terms "first", "second", etc. are only used to distinguish one element, from another element. Unless specifically stated otherwise, the terms "first", "second", etc. do not denote an order or importance. Therefore, a first element of an embodiment could be termed a second element of another embodiment without departing from the scope of the present disclosure. Similarly, a second element of an embodiment could also be termed a first element of another embodiment.

In the present disclosure, components that are distinguished from each other to clearly describe each feature do not necessarily denote that the components are separated. That is, a plurality of components may be integrated into one hardware or software unit, or one component may be distributed into a plurality of hardware or software units. Accordingly, even if not mentioned, the integrated or distributed embodiments are included in the scope of the present disclosure.

In the present disclosure, components described in various embodiments do not denote essential components, and some of the components may be optional. Accordingly, an embodiment that includes a subset of components described in another embodiment is included in the scope of the present disclosure. Also, an embodiment that includes the components described in the various embodiments and additional other components are included in the scope of the present disclosure.

Various embodiments of the present disclosure may be implemented in a smart phone, a tablet and other electronic devices equipped with display units. A video editing apparatus according to an embodiment of the present disclosure may be implemented by an electronic device equipped with a video editing application. Alternatively, the video editing apparatus may be implemented by an electronic device equipped with an image processing unit and a controlling unit capable of processing a video and subtitles data.

Preferably, an electronic device, to which various embodiments of the present disclosure are applied, means a portable electronic device.

FIG. 1 a view exemplifying an electronic device to which various embodiments of the present disclosure are applied. That is, FIG. 1 is a block diagram showing an electronic device 101 in a network environment 100.

Referring to FIG. 1, the electronic device 101 in the network environment 100 may communicate with an electronic device 102 through a first network 198 (e.g., short-range wireless communication) or communicate with an electronic device 104 or a server 108 through a second network 199 (e.g., long-range wireless communication). According to an embodiment, the electronic device 101 may communicate with the electronic device 104 through the server 108. According to an embodiment, the electronic device 101 may include a processor 120, a memory 130, an input device 150, a sound output device 155, a display device 160, an audio module 170, an interface 177, a camera module 180, a power management module 188, a battery 189, and a communication module 190. In a certain embodiment, the electronic device 101 may omit at least one (e.g., the display device 160 or the camera module 180) of the components or include another component.

The processor 120 may control at least one of the other components (e.g., hardware or software components) of the electronic device 101 connected to the processor 120, for example, by deriving software (e.g., a program 140) and perform processing and operation for various data. The processor 120 may process a command or data received from another component (e.g., the communication module 190) by loading the command or data in a volatile memory 132 and store result data in non-volatile memory 134. According to an embodiment, the processor 120 may be operated independently of a main processor 121 (e.g., a CPU or an application processor) and additionally or alternatively use less power than the main processor 121 or include a coprocessor 123 specialized in a designated function (e.g., a graphics processing unit, an image signaling processor, a sensor hub processor, or a communication processor). Herein, the coprocessor 123 may be operated independently of or by being embedded in the main processor 121.

In this case, the coprocessor 123 may control at least some functions or states associated with at least one (e.g., the display device 160 or the communication module 190) of the components of the electronic device 101, instead of the main processor 121 while the main processor 121 is in an inactive (e.g., sleep) state or along with the main processor 121 while the main processor 121 is in an active (e.g., application operating) state. According to an embodiment, the coprocessor 123 (e.g., an image signaling processor or a communication processor) may be implemented as a component of another functionally associated component (e.g., the camera module 180 or the communication module 190). The memory 130 may store various data used by at least one component (e.g., the processor 120), that is, input data or output data for software (e.g., the program 140) and a command associated therewith. The memory 130 may include the volatile memory 132 or the non-volatile memory 134.

As software stored in the memory 130, the program 140 may include, for example, an operating system 142, middle ware 144 or an application 146.

The input device 150 is a device for receiving a command or data to be used for a component (e.g., the processor 120) of the electronic device 101 from the outside (e.g., a user) of the electronic device 101. The input device 150 may include a microphone, a mouse or a keyboard.

The sound output device 155 is a device for outputting an acoustic signal to the outside of the electronic device 101. The sound output device 155 may include a speaker used for a general purpose like multimedia play or playback and a receiver used exclusively for receiving telephone calls. According to an embodiment, a receiver may be integrated with or separate from a speaker.

The display device 160 is a device for visually provide a user with information of the electronic device 101. The display device 160 may include, for example, a display, a hologram device, or a projector and a control circuit for controlling the device. According to an embodiment, the display device 160 may include touch circuitry or a pressure sensor capable of measuring a pressure intensity for a touch. Correspondingly, based on touch circuitry or a pressure sensor, the display device 160 may detect a coordinate of a touched input region, the number of touched input regions and a touched input gesture, and provide a detection result to the main processor 121 or the coprocessor 123.

The audio module 170 may bidirectionally convert a sound and an electrical signal. According to an embodiment, the audio module 170 may obtain a sound through the input device 150 or output a sound through the sound output device 155 or an external electronic device (e.g., the electronic device 102 (e.g., a speaker or a headphone)) wired or wirelessly connected to the electronic device 101.

The interface 177 may support a designated protocol capable of wired or wireless connection to an external electronic device (e.g, the electronic device 102). According to an embodiment, the interface 177 may include a high definition multimedia interface (HDMI), a universal serial bus (USB) interface, a SD card or an audio interface.

A connection terminal 178 may include a connected capable of physically connecting the electronic device 101 and an external electronic device (e.g., the electronic device 102), for example, a HDMI connector, a USB connector, a SD card connector or an audio connector (e.g., a headphone connector).

The camera module 180 may shoot a still image and a moving image. According to an embodiment, the camera module 180 may include one or more lenses, an image sensor, an image signal processor or a flash.

The power management module 188 is a module for managing power supplied to the electronic device 101 and may be, for example, a part of a power management integrated circuit (PMIC).

The battery 189 is a device for supplying power to at least one component of the electronic device 101 and may include, for example, a non-rechargeable primary cell, a rechargeable secondary cell or a fuel cell.

The communication module 190 may establish a wired or wireless communication channel between the electronic device 101 and an external electronic device (e.g., the electronic device 102, the electronic device 104, or the server 108) and support the execution of communication through the established communication channel. The communication module 190 may include one or more communication processors that are operated independently of the processor 120 and support wired or wireless communication. According to an embodiment, the communication module 190 may include a wireless communication module 192 (e.g, a cellular communication module, a short-range wireless communication module, or a global navigation satellite system (GNSS)) or a wired communication module 194 (e.g., a local area network (LAN) communication module, or a power line communication module) and communicate with an external electronic device by using a corresponding communication module through a first network 198 (e.g., a short-range communication network like Bluetooth, BLE (Bluetooth Low Energy), WiFi direct or IrDA (Infrared Data Association)) or a second network 199 (e.g., a long-range communication network like a cellular network, the Internet or a computer network (e.g., LAN or WAN)). The various types of communication modules 190 described above may be implemented as a single chip or separate chips respectively.

Among the above components, some components may exchange a signal (e.g., a command or data) by being connected with each other through a communication type (e.g., bus, general purpose input/output (GPIO), serial peripheral interface (SPI)) among peripheral devices or a mobile industry processor interface (MIPI).

According to an embodiment, a command or data may be transmitted or received between the electronic device 101 and the external electronic device 104 through the server 108 connected to the second network 199. Each electronic device 102 and 104 may be a device of a same type as or a different type from the electronic device 101. According to an embodiment, all or some of the operations performed in the electronic device 101 may be performed in another external electronic device or in a plurality of external electronic devices. According to an embodiment, when the electronic device 101 has to execute a function or service either automatically or at a request, the electronic device 101 may request at least some functions associated with the function or service to an external electronic device either additionally or instead of executing the function or service by itself. When receiving the request, the external electronic device may execute requested function or service and deliver a corresponding result to the electronic device 101. The electronic device 101 may provide the requested function or service by processing the received result either as it is or additionally. For this, for example, cloud computing technology, distributed computing technology, or client-server computing technology may be used.

Figure 2:
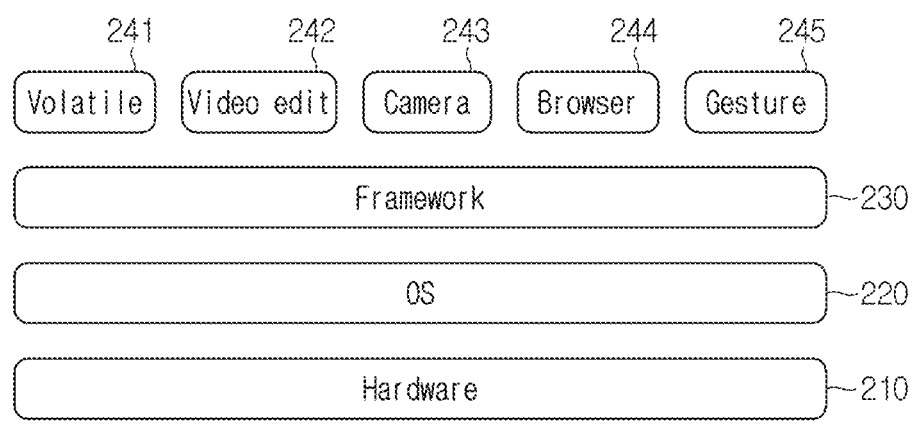
FIG. 2 is a view for describing a system hierarchy of an electronic device to which various embodiments of the present disclosure are applied.

FIG. 2 is a view for describing a system hierarchy of an electronic device to which various embodiments of the present disclosure are applied.

Referring to FIG. 2, an electronic device 200 may be configured by including a hardware layer 201 corresponding to the electronic device 100 of FIG. 1, an operating system (OS) layer 200 as an upper layer of the hardware layer 210 for managing the hardware layer 210, and a framework layer 230 and an application layer 240 as upper layers of the OS layer 220.

The OS layer 220 controls the overall operation of the hardware layer 210 and manages the hardware layer 210. That is, the OS layer 220 is a layer executing basic functions including hardware management, memory and security. The OS layer 220 may include a display driver for driving a display device, a camera driver for driving a camera module, an audio driver for driving an audio module and any similar driver for operating or driving a hardware device installed in an electronic device. In addition, the OS layer 220 may include a runtime and a library accessible to a developer.

There is the framework layer 230 as an upper layer of the OS layer 220. The framework layer 230 links the application layer 240 and the OS layer 220. That is, the framework layer 230 includes a location manager, a notification manager and a frame buffer for displaying a video on a display unit.

The application layer 240 for implementing various functions of the electronic device 100 is located in an upper layer of the framework layer 230. For example, the application layer 240 may include various application programs like a call application 241, a video editing application 242, a camera application 243, a browser application 244, and a gesture application 245.

Furthermore, the OS layer 220 may provide a menu or UI capable of adding or deleting at least one application or application program included in the application layer 240. Accordingly, at least one application or application program included in the application layer 240 may be added or deleted by a user. For example, as described above, the electronic device 100 of FIG. 1 may be connected to another electronic device 102 and 104 or the server 108 via communication. At a user's request, the electronic device 100 may receive and store data (that is, at least one application or application program) from another electronic device 102 and 104 or the server 108 and include the data in a memory. Herein, the at least one application or application program stored in the memory may be configured and operated in the application layer 240. In addition, at least one application or application program may be selected by a user through a menu or UI provided by the OS layer 220. The at least one application or application program thus selected may be deleted.

Meanwhile, when a user control command input through the application layer 240 is input into the electronic device 100, as the input control command is delivered from the application layer 240 to the hardware layer 210, a specific application corresponding to the command may be implemented and a corresponding result may be displayed in the display device 160.

Figure 3:
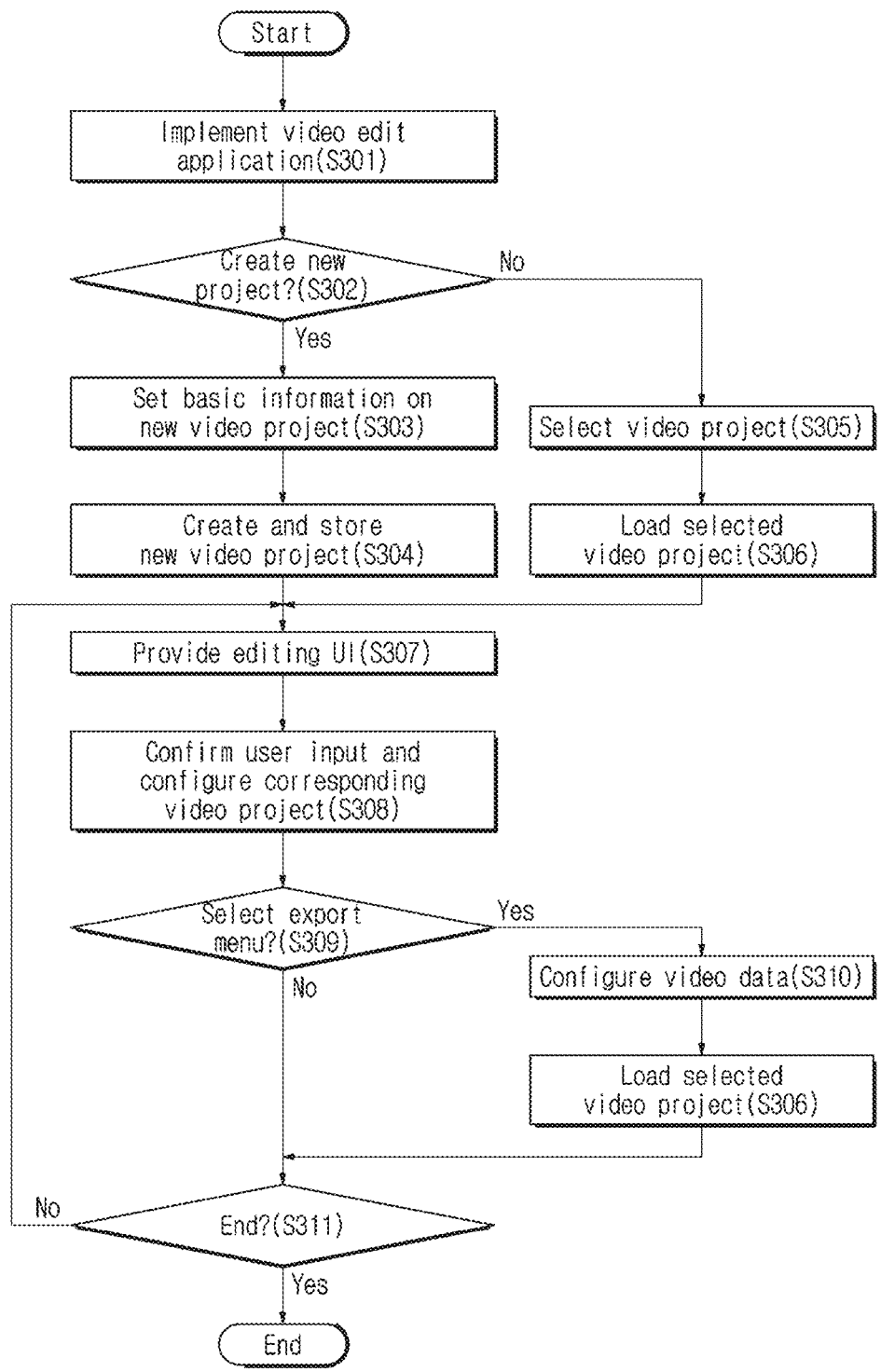
FIG. 3 is a flow chart exemplifying an order of a video editing method to which various embodiments of the present disclosure are applied.
Figure 4:
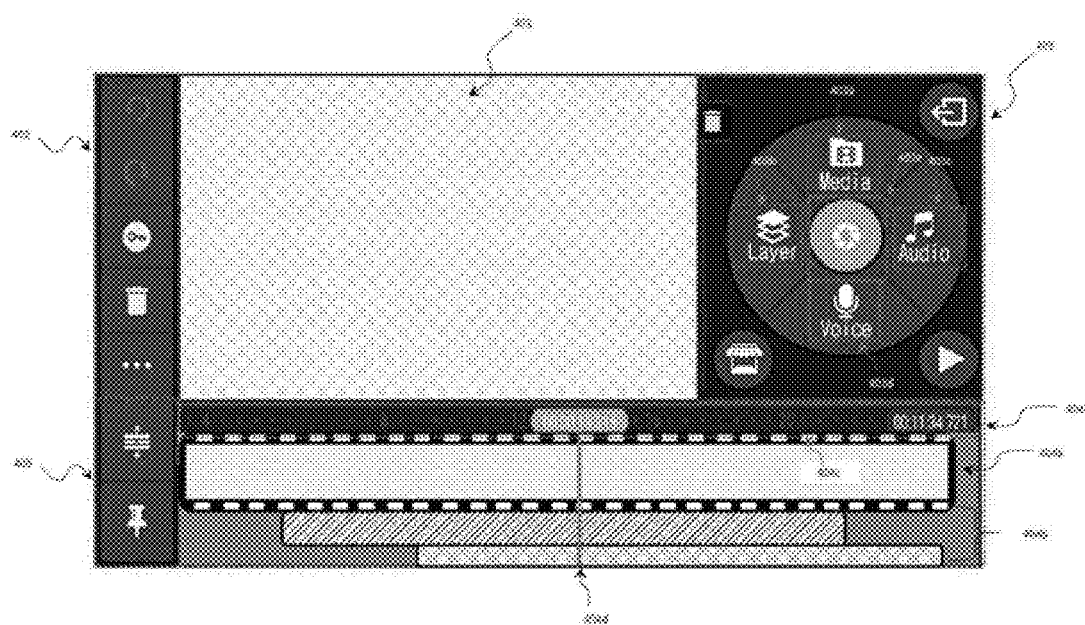
FIG. 4 is a view exemplifying an editing UI provided in a video editing UI control apparatus according to various embodiments of the present disclosure.
Figure 5A:
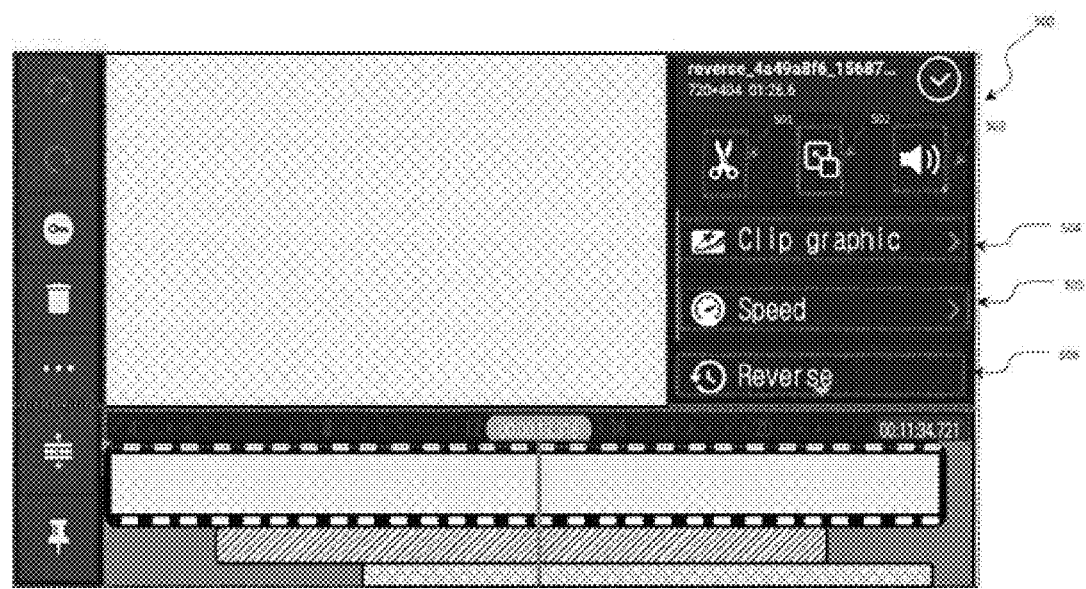
FIG. 5A to FIG. 5E are views exemplifying a clip editing UI provided in a video editing UI control apparatus according to various embodiments of the present disclosure.
Figure 5B:
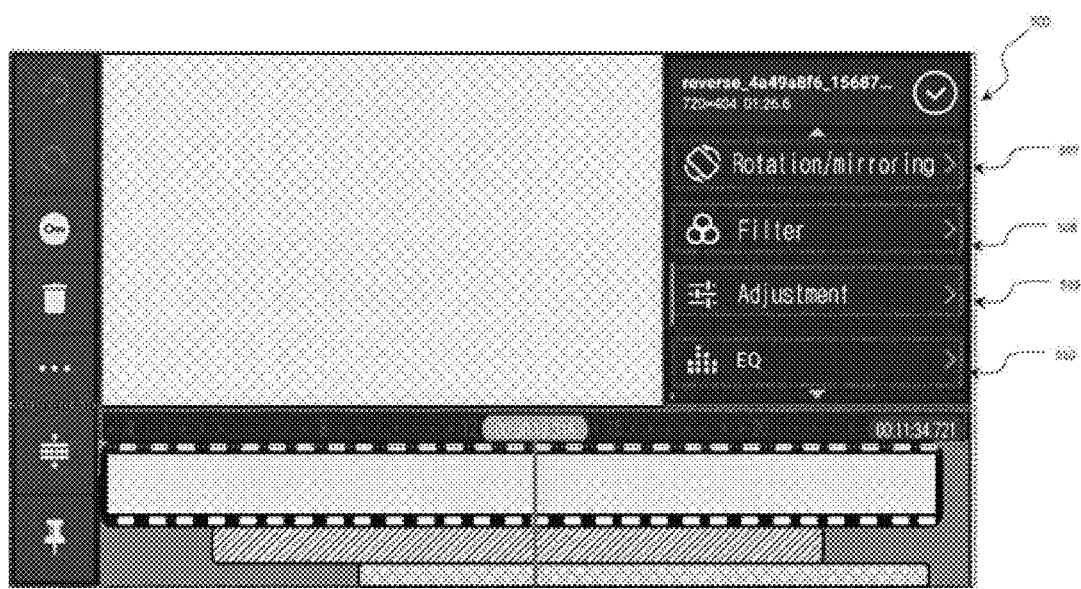
Figure 5C:
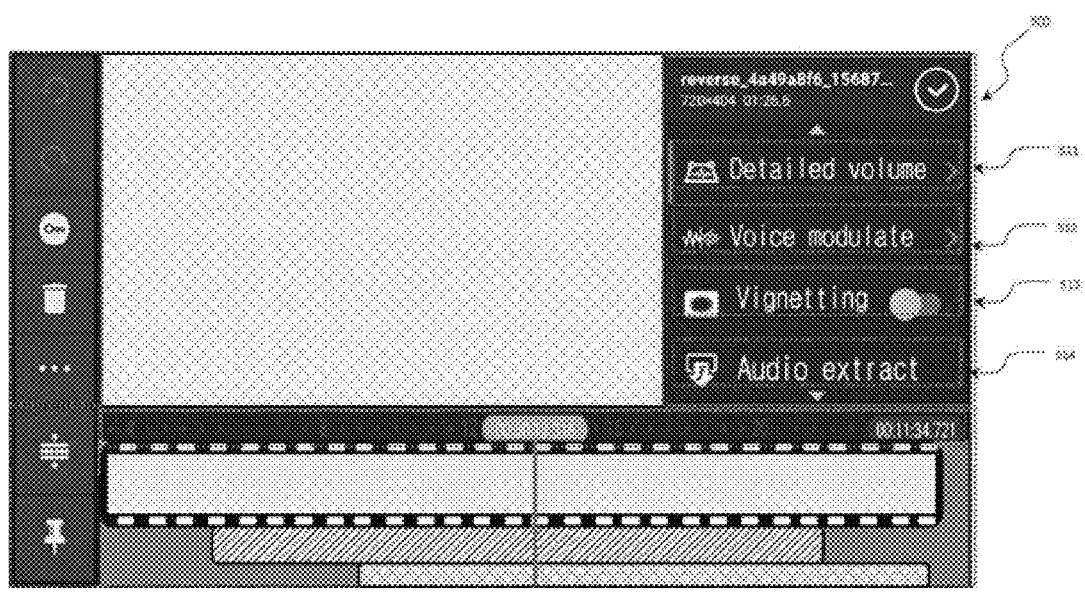
Figure 5D:
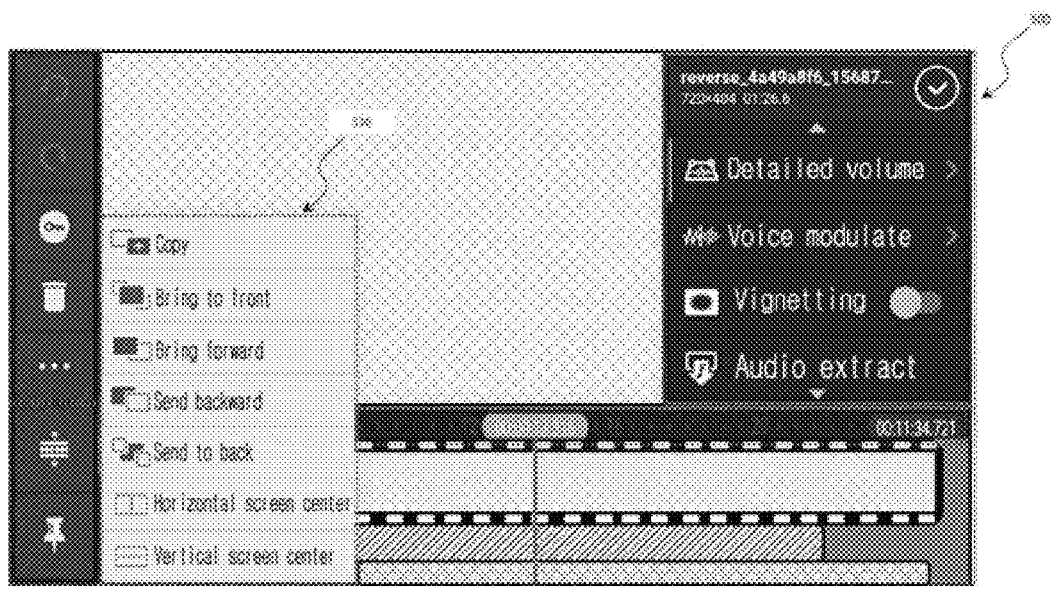
Figure 5E:
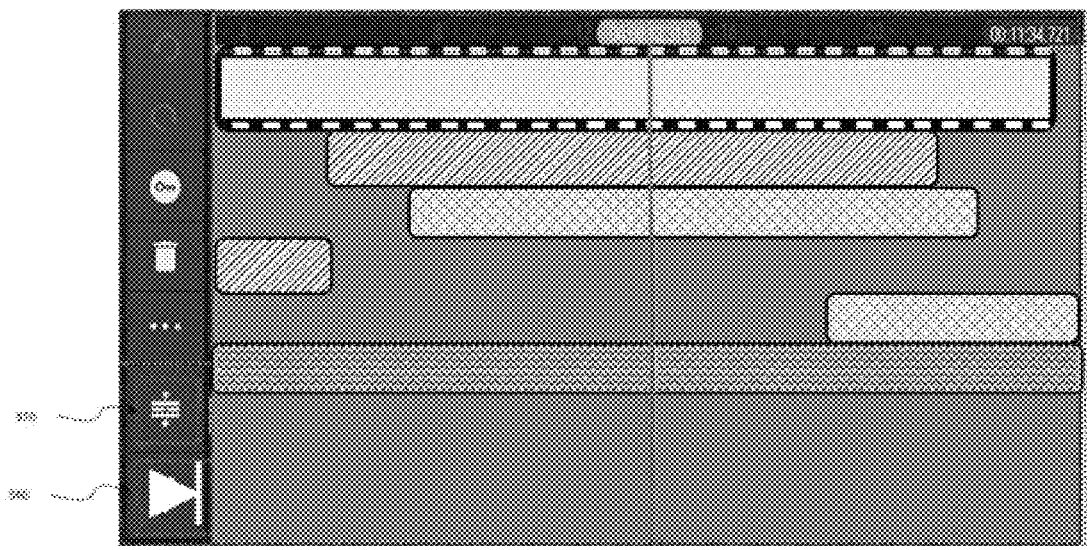

FIG. 3 is a flow chart exemplifying an order of a video editing method to which various embodiments of the present disclosure are applied.

Referring to FIG. 3, first, a video editing method may be implemented by the above-described electronic device, and the implementation may start, when a video editing application is selected and implemented by a user input (S301).

When the video editing application is implemented, the electronic device may output an initial screen of the video editing application to a display device (e.g., display). An initial screen may provide a menu (or UI) for creating a new video project and a video project selection menu (or UI) for selecting a video project already being edited. In such an initial screen, when a menu (or UT) for creating a new video project is selected, the step S303 may be performed. When a video project selection menu (or UI) is selected, the step S305 may be performed, in the step S303, the electronic device may provide a menu (or UI) for setting basic information of a new video project and set and apply the basic information put through the menu (UI) to the new video project. For example, basic information may include a screen ratio of a new video project. Based on this, the electronic device may provide a menu (or UI) for selecting a screen ratio like 16:9, 9:16 and 1:1 and set and apply a screen ratio input through the menu (UI) to a new video project.

Next, by reflecting basic information set in the step S303, the electronic device may create a new video project and store the new video project thus created in a storing medium (S304).

Although an embodiment of the present disclosure presents a screen ratio as basic information, the present disclosure is not limited to the embodiment, which may be modified in various ways by those skilled in the art. For example, an electronic device may provide a menu (or UI) for setting at least one of the automatic control of master volume, a master volume size, a basic audio fade-in setting, a basic audio fade-out setting, a basic video fade-in setting, a basic video fade-out setting, a basic setting of an imam clip, a basic setting of a layer length, and basic settings of image clip pan & zoom. The electronic device may set a value input through the menu (or UI) as basic information of a new video project.

For another example, an electronic device may automatically set predetermined values for automatic control of master volume, a master volume size, a basic audio fade-in setting, a basic audio fade-out setting, a basic video fade-in setting, a basic video fade-out setting, a basic setting of an image clip, a basic setting of a layer length, and basic settings of image clip pan zoom. In addition, an electronic device may provide a setting menu (or UI) and receive inputs of control values for automatic control of master volume, a master volume size, a basic audio fade-in setting, a basic audio fade-out setting, a basic video fade-in setting, a basic video fade-out setting, a basic setting of an image clip, a basic setting of a layer length, and basic settings of image clip pan & zoom. The electronic device may also set the above-described basic information according to the input values.

Meanwhile, in the step S305, the electronic device may provide a project list including a video project stored in the storing medium and an environment in which at least one video project included in the project list may be selected. Through the environment described above, a user may select at least one video project included in the project list, and the electronic device may load at least one video project selected by the user (S306).

In the step S307, the electronic device may provide an editing UI. The editing UI may include a video display window 401, a media setting window 402, a media input window 403, a dip display window 404, and a clip setting window 405. In an editing UI, a video display window, a media setting window and a media input window may appear in the upper part of the display, while a clip display window and a clip setting window may appear in the lower part of the display.

The media setting window may include an export menu, a capture menu and a setting menu. The export menu, the capture menu and the setting menu may be provided in forms of icon or text enabling these menus to be recognized.

The media input window may include a media input menu 403A, a layer input menu 403B, an audio input menu 403C, a voice input menu 403D and a shooting menu 403E. The media input menu 403A, the layer input menu 403B, the audio input menu 403C, the voice input menu 403D and the shooting menu 403E may be provided in forms of icon or text enabling these menus to be recognized. In addition, each menu may include a sub-menu. When each menu is selected, the electronic device may configure and display a corresponding sub-menu.

For example, the media input menu 403A may be connected to a media selection window as a sub-menu, and the media selection window may provide an environment in which media stored in a storing medium can be selected. The media selected through the media selection window may be inserted into and displayed in a clip display window. The electronic device may confirm a type of media selected through the media selection window. The electronic device may set a clip time of the media and insert and display the clip time in the clip display window by considering the confirmed type of media. Here, the type of media may include an image, a video and the like. When the type of media is an image, the electronic device may confirm a basic set value of length of an image clip and set an image clip time according to the basic set value of length of the image clip. In addition, when the type of media is a video, the electronic device may set a video clip time according to the length of the video.

The layer input menu 403B may include, as sub-menus, a media input menu, an effect input menu, an overlay input menu, a text input menu, a media input menu, and a drawing input menu.

A media input menu may be configured in a same way as the above-described media input menu.

An effect input may provide an environment to select a blurring effect, a mosaic effect, a noise effect, a sandstorm effect, a melting point effect, a crystal effect, a star filter effect, a display board effect, a haze effect, a fisheye lens effect, a magnifying lens effect, a flower twist effect, a night vision goggle effect, and a sketch effect. An effect selected through the effect input menu may be inserted and displayed in a clip display window. Herein, an electronic device may confirm a basic set value of layer length and set an effect clip time according to the basic set value of layer length.

An overlay input menu may provide an environment to select various forms or shapes of stickers and icons. A sticker and an icon selected through the overlay input menu may be inserted and displayed in a clip display window. Herein, an electronic device may confirm a basic set value of layer length and set clip time for sticker, icon and the like according to the basic set value of layer length.

A text input menu may provide an environment to input a text, that is, a QWERTY keyboard. A text selected through the text input menu may be inserted and displayed in a clip display window. Herein, an electronic device may confirm a basic set value of layer length and set a text clip time according to the basic set value of layer length.

A drawing input menu may provide a drawing area to a video display window and be configured such that a drawing object is displayed in a touch input area of the video display window. A handwriting input menu may include, as sub-menus, a drawing tool selection menu for selecting a drawing tool, a color selection menu for selecting a drawing color, a thickness setting menu for setting thickness of a drawing object, a partial delete menu for deleting a created drawing object, and an entire delete menu for deleting an entire object that has been drawn. In addition, when a handwriting input menu is selected, an electronic device may confirm a basic set value of layer length and set a drawing object clip time according to the basic set value of layer length.

The audio input menu 403C may be connected to an audio selection window as a sub-menu. The audio selection window may provide an environment to select an audio file stored in a storage medium. An audio file selected through the audio selection window may be inserted and displayed in a clip display window.

The voice input menu 403D may be a menu for recording a sound input through a microphone. When the voice input menu is selected by a user, an electronic device may detect an audio signal input through a microphone by activating the microphone included in the electronic device, in addition, the electronic device may show a start recording button. When the start recording button is input, audio signals may start being recorded. Furthermore, the electronic device may visually display audio signals input through the microphone. For example, the electronic device may confirm a size or frequency feature of an audio signal and display the feature thus confirmed in a form of level meter or graph.

The shooting menu 403E is a menu for shooting an image or a video that is input through a camera module provided to an electronic device. The shooting menu 403E may be shown by an icon or the like visualizing a camera device. The shooting menu 403E may include an image/video shooting selection menu, as a sub-menu, for selecting a camera for capturing an image or a camcorder for shooting a video. Based on this, when the shooting menu 403E is selected by a user, the electronic device may display the image/video shooting selection menu. In addition, the electronic device may activate an image shooting mode or a video shooting mode of a camera module according to what is selected through the image/video shooting selection menu.

The clip display window 404 may include at least one clip line for displaying clips corresponding to media, effects, overlays, texts, drawings, audio or speech signals that are input through the media input window.

A clip line may include a main clip line 404A and a sub clip line 404B. The main clip line 404A may be a clip line provided at the top of a clip display window, and the sub clip line 404B may be at least one clip line provided below the main clip line 404A.

An electronic device may display the main clip line 404A by fixing the main clip line 404A at the top of a clip display window. The electronic device may confirm a drag input in an area, in which the sub clip line 404B exists, and display the sub clip line 404B by scrolling the sub clip line 404B up and down in response to a direction of the drag input.

Furthermore, when the direction of the drag input is an upward direction, the electronic device may display the sub clip line 404B by moving the sub clip line 404B to an upper area. When the direction of the drag input is a downward direction, the electronic device may display the sub clip line 404B by moving the sub clip line 404B to a lower area. In addition, the electronic device may differently display the vertical width of the main clip line 404A in response to movement of the sub clip line 404B. For example, when the sub clip line 404B moves upwards, the vertical width of the main clip line 404A may be decreased. When the sub clip line 404B moves downwards, the vertical width of the main clip line 404A may be increased.

In particular, a clip display window may include a time display line 404C for indicating a time of a video project and a play head 404D. The time display line 404C may be displayed on top of the main clip line 404A described above and include figures or ticks in predetermined units. In addition, the play head 404D may be displayed as a vertical line starting from the time display line 404C to the bottom of the clip display window. The play head 404D may be shown in a color (e.g., red) that may be easily recognized by a user.

Furthermore, the play head 404D may be provided with a fixed form in a predetermined area. Objects included in the main clip line 404A and the sub clip line 404B and the time display line 404C, which are provided in the clip display window, may be so configured as to move horizontally.

For example, when a drag input horizontally occurs in an area in which the main clip line 404A, the sub clip line 404B and the time display line 404C are located, the electronic device may horizontally move and display the time display line 404C and objects included in the main clip line 404A and the sub clip line 404B. Herein, a frame or an object corresponding to the play head 404D may be so configured as to be displayed in the video display window. Also, the electronic device 404D may confirm a detailed time (e.g., 1/1000 second unit), in which the play head is touched, and also display the confirmed detailed time in the clip display window.

In addition, the electronic device may check whether or not multiple touches occur in the clip display window. When multiple touches occur, the electronic device may respond to the multiple touches by changing and displaying a tick or figure in a predetermined unit included in the time display line 404C. For example, when an input is detected with a gradually decreasing interval of multiple touches, the electronic device may display a tick or figure by decreasing an interval of the tick or figure. When an input is detected with a gradually increasing interval of multiple touches, the electronic device may display the tick or figure by increasing the interval of the tick or figure.

The electronic device may configure the clip display window 404 such that a clip displayed in a clip line may be selected. When the clip is selected, the electronic device may visually show that the clip is selected. For example, when the electronic device detects that a clip is selected, the electronic device may display a boundary of the selected clip in a predetermined color, for example, yellow.

Preferably, when it is detected that a clip is selected, the electronic device may provide a clip editing UI capable of editing the selected clip. For example, the electronic device may display a clip editing UI in area where the media input window 403 exists. A clip editing UI may be differently set according to the type of a selected clip. Specifically, when a type of clip is a video clip, the electronic device configure and provide a clip editing UI 500 by including a trim/split menu 501, a pan/zoom menu 502, an audio control menu 503, a clip graphics menu 504, a speed control menu 505, a reverse control menu 506, a rotation/mirroring control menu 507, a filter menu 508, a brightness/contrast adjustment menu 509, a voice EQ control menu 510, a detailed volume control menu 511, a voice modulation menu 512, a vignetting control menu 513, and an audio extraction menu 514.

A clip editing UI for each clip type may be configured based on the structures of video editing UIs in FIG. 7A to FIG. 7G below. A clip editing UI may be configured with reference to FIG. 7A to FIG. 7G.

In addition, the electronic device may further display a clip editing expansion UI 530 in an area in which a media setting window exists. A clip editing expansion UI displayed in an area of media setting window may be also differently set according to a type of a selected clip. For example, when a type of clip is a video clip, an image clip, an audio clip or a voice signal clip, the electronic device may configure and provide the clip editing expansion UI 530 including a clip delete menu, a clip copy menu and a clip layer copy menu. When a type of clip is an effect clip, a text clip, an overlay clip or a drawing clip, the electronic device may configure and provide the clip editing expansion UI including a clip delete menu, a clip copy menu, a bring to front menu, a bring forward menu, a send backward menu, a send to back menu, a horizontal center alignment menu, and a vertical center alignment.

A clip setting window may include a clip expansion display menu 550 and a clip movement control menu 560. When the clip expansion display menu 550 is selected by a user, the electronic device may display a clip display window by expanding the window to the entire area of display. In addition, when the clip movement control menu 560 is selected, the electronic device may display a clip by moving the clip to a play head. Furthermore, the clip movement control menu 560 may include a start area movement menu or an end area movement menu. The start area movement menu or the end area movement menu needs to be adaptively displayed by considering the position of a play head touching a clip. For example, the electronic device may basically provide the start area movement menu. When a clip touches the start position of a play head, the start area movement menu may be replaced by the end area movement menu.

In the step S308, the electronic device may confirm a user input that is input through an editing UI, configure a corresponding video project and store the configured video project in a storage medium.

As described above, an editing UI may be configured to include an export menu in a media setting window. When the export menu is selected by a user (e.g., S309), the electronic device may configure video data by reflecting information that is configured in a video project and store the video data in a storage medium (S310).

Figure 6:
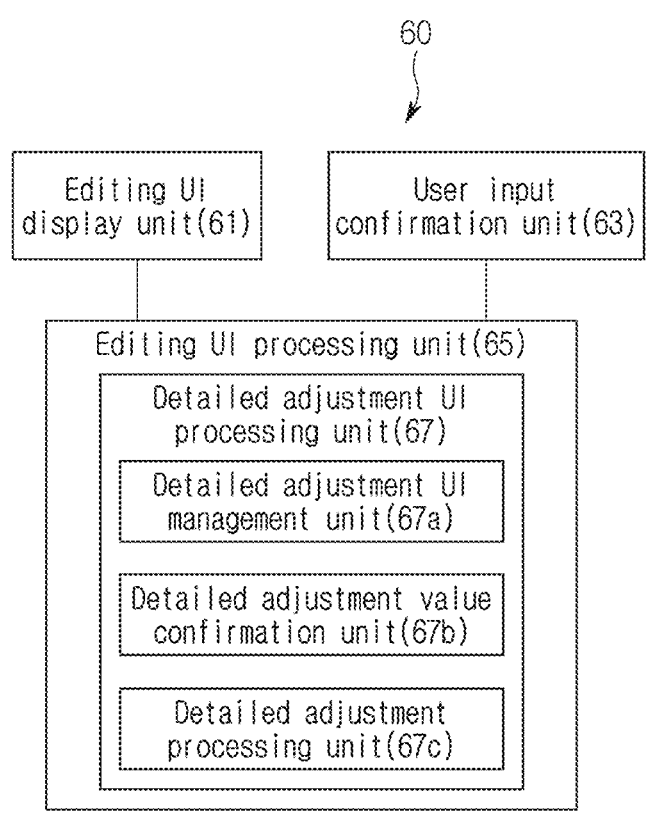
FIG. 6 is a block diagram exemplifying a configuration of a video editing UI control apparatus according to various embodiments of the present disclosure.

FIG. 6 is a block diagram exemplifying a configuration of a video editing UI control apparatus according to various embodiments of the present disclosure.

Referring to FIG. 6, a video editing UI control apparatus according to various embodiments of the present disclosure may include an editing UI display unit 61, a user input confirmation unit 63 and an editing UI processing unit 65.

The editing UI display unit 61 may visually display the above-described editing UI in a display device (e.g., a display). In particular, the editing UI display unit 61 may confirm a menu or UI, which is to be output at the request of the editing UI processing unit 65, and output the menu or UI in the display device (e.g., the display). Herein, the editing UI may include various menus or UIs having a predetermined form and size. In particular, the editing UI may include a main editing UI and a detailed adjustment UI.

Among various menus or UIs used in various embodiments of the present disclosure, menus or UIs used for video editing may be collectively referred to as "editing UIs". In addition, a main editing UI may be contrasted with a detailed adjustment UI. The main editing UI may be provided in an upper layer of the detailed adjustment UI. In various embodiments of the present disclosure, the main editing UI processes an input corresponding to a user's touch input or drag input. The processing range of the main editing UI may be set to be larger than the processing range of the detailed adjustment UI. In addition, a detailed adjustment UI may work with the main editing UI and be configured to perform fine processing according to a direction of user input that is input through the main editing UI.

An editing UI (especially, a main editing UI and a detailed adjustment UI) that the editing UI display unit 61 outputs through a display will be described in detail with reference to FIG. 7A to FIG. 7G, FIG. 9A to FIG. 9D and FIG. 11A to FIG. 11E.

Based on a coordinate of a touch-input area, the number of touch-input areas and a touch-input gesture that are provided through the above-described display device 160 (see FIG. 1), the user input confirmation unit 63 may confirm user input information such as a coordinate of a user input, a type of a user input (e.g., a single touch input, a multi touch input, a single gesture input, a multi gesture input, etc.) and a direction of (single or multi) gesture input and provide the confirmed user input information to the editing UI processing unit 65.

The editing UI processing unit 65 may confirm the user input information provided by the user input confirmation unit 63 and process an operation corresponding to the user input information. For example, the editing UI processing UI 65 may confirm a coordinate of user input and conform and process an operation corresponding to a menu or UI that exists at the confirmed coordinate. As another example, the editing UI processing unit 65 may confirm a sub-menu or sub-UI of the menu or UI, which exists at the confirmed coordinate, and request the editing UI display unit 61 to output the confirmed sub-menu or sub-UI. Herein, the editing UI processing unit 65 may confirm the sub-menu or sub-UI based on the editing UIs illustrated in FIG. 7A to FIG. 7G.

In particular, the editing UI processing unit 65 may include a detailed adjustment UI processing unit 67 for providing a detailed adjustment UI. The detailed adjustment UI processing unit 67 may include a detailed adjustment UI management unit 67A, a detailed adjustment value confirmation unit 67B and a detailed adjustment processing unit 67C.

The detailed adjustment UI management unit 67A may be configured to confirm an output request of a main editing UI and to output a detailed adjustment UI together with the main editing UI. As the main editing UI may be variously configured or have various shapes, sizes and positions, the detailed adjustment UI management unit 67A may adjust a size and position of a detailed adjustment UI and request output to the editing UI display unit 61 with consideration of a configuration of the main editing UI.

Furthermore, not all main editing UIs included in an editing UI need to support a detailed adjustment UI. A specific main editing UI that is predetermined may be configured to support a detailed adjustment UI. Based on this, when outputting a main editing UI, the detailed adjustment UI management unit 67A may check whether or the main editing UI supports a detailed adjustment UI. Only when the main editing UI is confirmed to support the detailed adjustment UI, the detailed adjustment UI management unit 67A may request the editing UI display unit 61 to output the detailed adjustment UI.

Preferably, a detailed adjustment UI (refer to 913G and 1115E) may be configured to input a first detailed adjustment value and a second detailed adjustment value. For example, the detailed adjustment UI may include a first button and a second button shaped in "▲" and "▼" (refer to 913H and 913I).

The detailed adjustment value confirmation unit 67B may confirm user input information, which is input through a detailed adjustment UI when the detailed adjustment UI is output, and a detailed adjustment value corresponding to the user input information.

Herein, the detailed adjustment value confirmation unit 67B may set input values of the first button and the second button (refer to 913H and 913I) in response to an input value of a main editing UI. In other words, the detailed adjustment value confirmation unit 67B may set an input value of the first button (e.g., "▲") in the direction of input through the main editing UI and an input value of the second button (e g., "▼") in the opposite direction to the direction of input through the main editing UI. For example, when input is performed to decrease an alpha value (transparency) using a main editing UI, the detailed adjustment confirmation unit 67B may set an input value, which decreases the alpha value (transparency) at a predetermined interval (e.g., 1%), to the first button (e.g., "▲") and an input value, which increases the alpha value (transparency) at a predetermined interval (e.g., 1%), to the second button (e.g., "▼"). On the contrary, when input is performed to increase an alpha value (transparency) using a main editing UI, the detailed adjustment confirmation unit 67B may set an input value, which increases the alpha value (transparency) at a predetermined interval (e.g., 1%), to the first button (e.g., "▲") and an input value, which decreases the alpha value (transparency) a predetermined interval (e.g., 1%), to the second button (e.g., "▼").

As another example, the detailed adjustment confirmation unit 67B may set the first button (e.g., "▲") of a detailed adjustment UI to process an input with a positive value and the second button (e.g., "▼") to process an input with a negative value. Furthermore, for the first button and the second button included in the detailed adjustment UI, a different positive value d a different negative value may be applied respectively according to a menu or UT to which the detailed adjustment UI is applied. Accordingly, the detailed adjustment value confirmation unit 67B may set and store in advance configurations of detailed adjustment values corresponding to the first button and the second button respectively according to each menu or UI. When outputting the detailed adjustment UI, detailed adjustment values corresponding to the first button and the second button may be confirmed and applied to the first button and the second button.

In addition, the detailed adjustment value confirmation unit 67B may provide a confirmed detailed adjustment value to the detailed adjustment processing unit 67C. The detailed adjustment processing unit 67C may reflect the detailed adjustment value in an adjustment target confirmed in the detailed adjustment UI management unit 67A and provide a corresponding result to the editing UI display unit 61. Thus, the editing UI display unit 61 may also display the result reflecting the detailed adjustment value in a menu (or UI) included in the editing UI.

As described above, the detailed adjustment UI processing unit 67 confirm a target requiring detailed adjustment and also user input information by providing a relatively simplified detailed adjustment UI. Accordingly, detailed adjustment may be performed by configuring a simplified detailed adjustment UI, instead of configuring different detailed adjustment UIs with a complicated structure for different adjustment targets like translation, rotation angle and zoom in/out or instead of configuring and storing various detailed adjustment UIs with designs tailored to each adjustment target. Thus, the detailed adjustment processing unit 67 may provide an environment in which a resource of a portable electronic device is efficiently used and an editing work is smoothly done, by realizing a detailed adjustment UI with a simplified structure and low capacity. In particular, as fine adjustment may be easily input and processed in a portable electronic device equipped with a display device (e.g., display) having a limited size, a user's convenience may be significantly improved.

FIG. 7A to FIG. 7G are views exemplifying a structure of an editing UI provided in a video editing UI control apparatus according to various embodiments of the present disclosure.

First, the editing UI may include basically the video display window 401, the media setting window 402, the media input window 403, the clip display window 404 and the clip setting window 405. At least one clip selected through the media input window 403 may be displayed in the clip display window 404. In addition, as at least one clip (404A, 404B) included in the clip display window 404 is selected, clip editing menus 501 to 514 may be provided to an area in which the media input window 403 exists. Herein, the clip editing menus 501 to 514 may be adaptively provided according to structures of editing UIs of each clip type illustrated in FIG. 7A to FIG. 7G.

Figure 7A:
FIG. 7A to FIG. 7G are views exemplifying a structure of an editing UI provided in a video editing UI control apparatus according to various embodiments of the present disclosure.

Referring to FIG. 7A, a video clip editing menu may include a trim/split menu, a pan/zoom menu, an audio control menu, a clip graphics menu, a speed control menu, a reverse control menu, a rotation/mirroring menu, a filter menu, a brightness/contrast/gamma control menu, a voice EQ control menu, a detailed volume control menu, a voice modulation control menu, a vignetting ON/OFF control menu, and an audio extraction menu.

The trim/split menu may include, as sub-menus, a trim to the left of play head menu, a trim to the right of play head menu, a split-in-play head menu, and a still image split and insertion menu.

The audio control menu may include, as sub-menus, a master volume control bar, a sound effect volume control bar, an automatic volume ON/OFF menu, a left/right balance adjustment bar and a pitch adjustment bar. In addition, the master volume control bar, the sound effect control bar, the left/right balance adjustment bar and the pitch adjustment bar may be set to support a detailed adjustment UI. The master volume control bar, the sound effect control bar, the left/right balance adjustment bar and the pitch adjustment bar may be managed as main editing UIs. An UI that is set as a main editing UI may be configured to also display a detailed adjustment UI. As another example, a main editing UI, which is set to be supported by a detailed adjustment UI, may be configured to activate the detailed adjustment UI, when a touch input occurs for over a predetermined time (e.g., 1 second) in an area in which the main editing UI exists.

The clip graphics menu may be configured to select at least one graphic to be inserted into a clip.

The speed control menu may include at least one predetermined speed control button 1×, 4× and 8×), a speed control bar, a mute ON/OFF menu and a pitch maintenance ON/OFF menu. In addition, the speed control bar may be managed as a main editing UI.

The reverse control menu may be configured to perform reverse processing of a video included in a corresponding clip.

The voice EQ control menu may be configured to select at least one voice EQ to be applied to a video.

The filter menu may be configured to select at least one video filter to be applied to a video.

The brightness/contrast/gamma control menu may include a brightness control bar, a contrast control bar and a gamma control bar as sub-menus in order to control brightness/contrast/gamma values of a video. The brightness control bar, the contrast control bar and the gamma control bar may be managed as main editing UIs and be set to support a detailed adjustment UI.

The rotation/mirroring menu may include a horizontal mirroring menu, a vertical mirroring menu, a counterclockwise rotation menu and a clockwise rotation menu as sub-menus. The counterclockwise rotation menu and the clockwise rotation menu may be managed as main editing UIs and be set to support a detailed adjustment UI.

The detailed volume control menu is a menu for controlling a magnitude of voice included in a video. The detailed volume control menu may include a control point addition menu, a control point deletion menu and a voice control bar. The voice control bar may be managed as a main editing UI and be configured to support a detailed adjustment UI.

A voice modulation control menu may be configured to select at least one voice modulation method to be applied to a video.

Figure 7B:
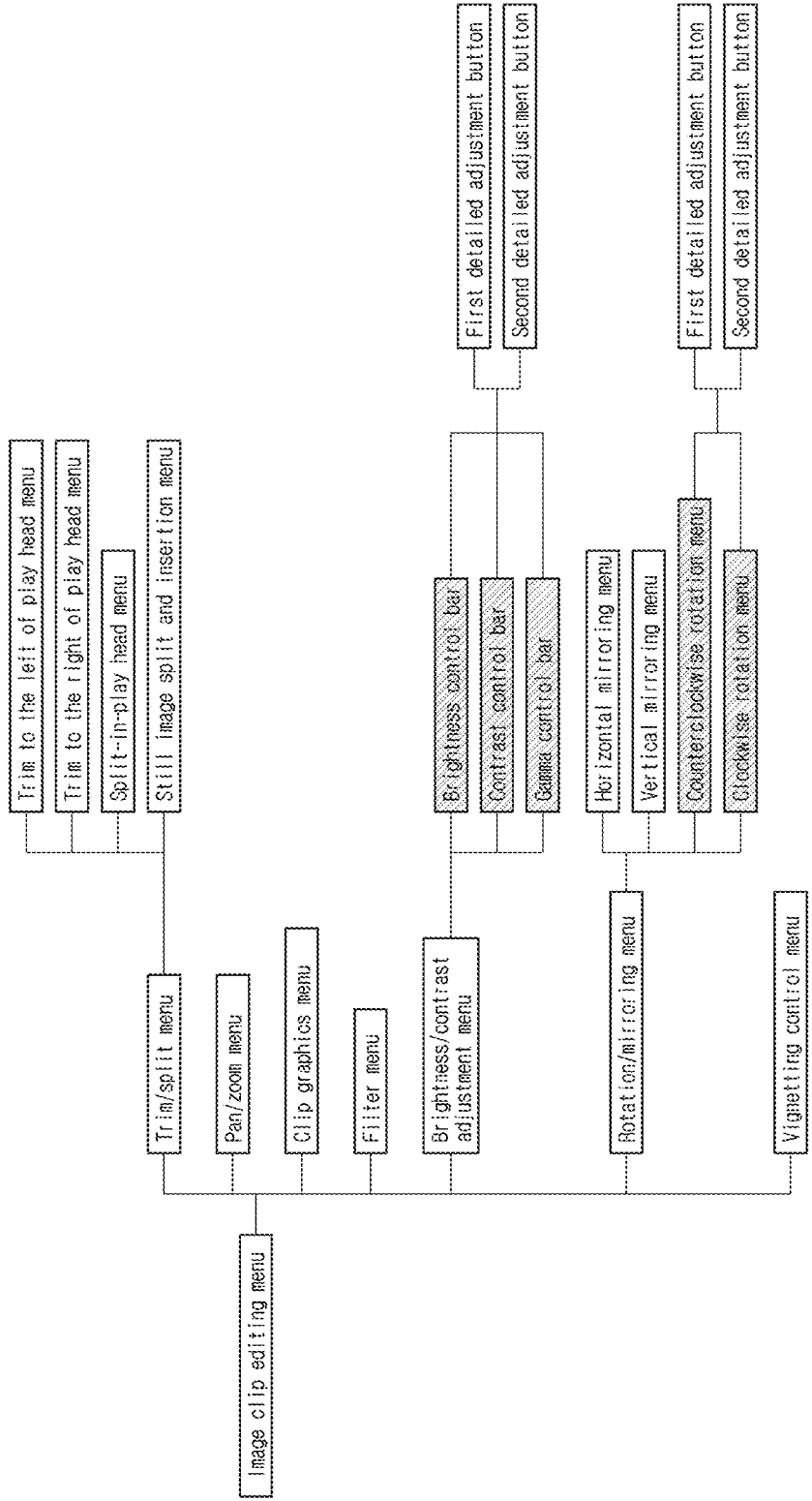

Referring to FIG. 7B, an image clip editing menu may include a trim/split menu, a pan/zoom menu, a rotation/mirroring control menu, a clip graphics menu, a brightness/contrast/gamma control menu and a vignetting ON/OFF control menu. These menus may be configured similarly to the control menu illustrated in FIG. 7A.

Figure 7C:
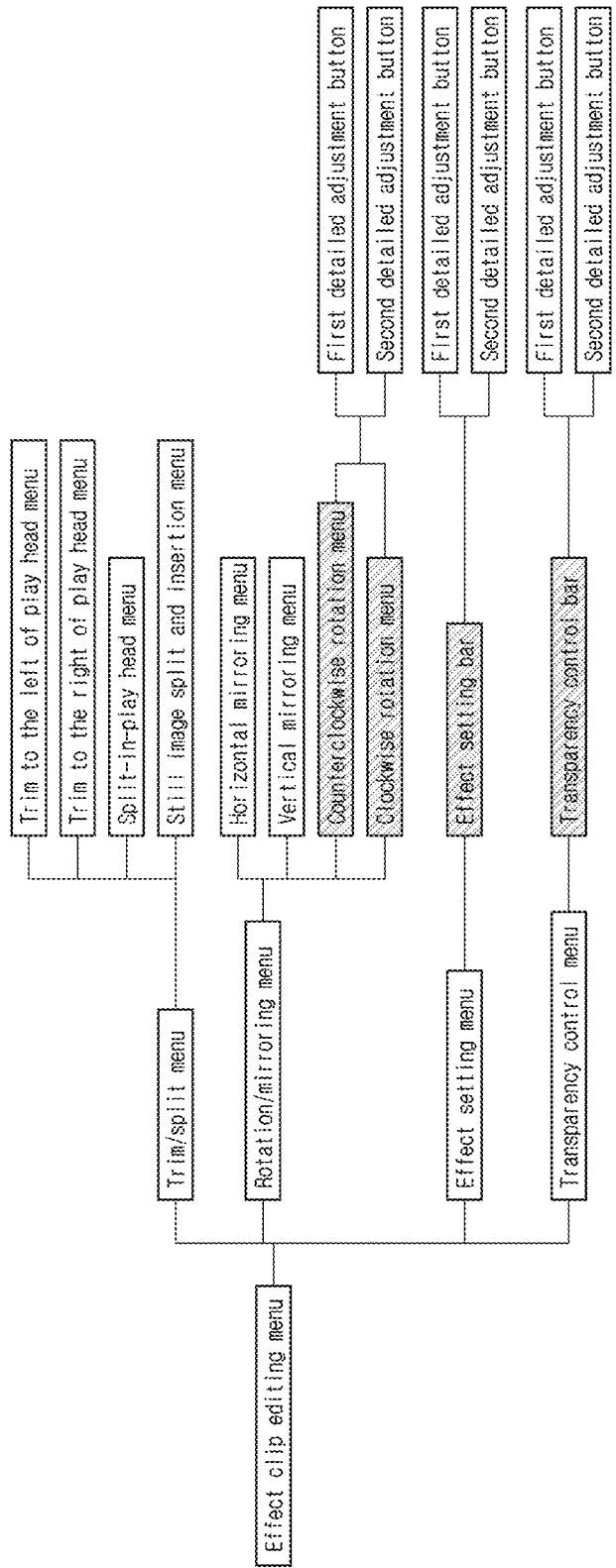

In addition, referring to FIG. 7C, an effect clip editing menu may include an effect setting menu, a transparency control menu, a trim/split menu and a rotation/mirroring control menu. The trim/split menu and the rotation/mirroring control menu may be configured similarly to the control menu illustrated in FIG. 7A. In addition, the effect setting menu and the transparency control menu may include an effect setting bar and a transparency control bar, respectively, as a sub-menu. The effect setting bar and the transparency control bar may be managed as main editing UIs and be configured to support a detailed adjustment UI.

Figure 7D:
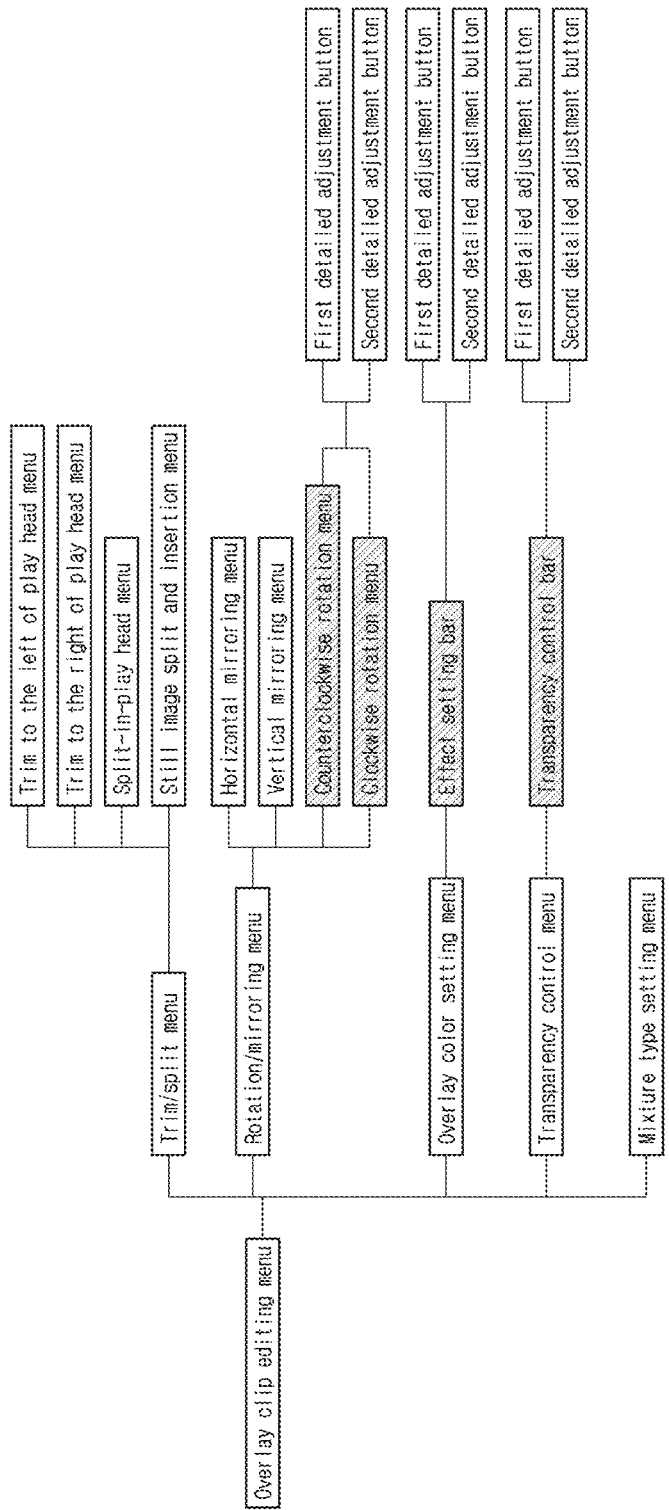

Referring to FIG. 7D, an overlay clip editing menu may include an overlay color setting menu, a transparency control menu, a trim/split menu, a rotation/mirroring control menu and a mixture type setting menu. The trim/split menu and the rotation/mirroring control menu may be configured similarly to the control menu illustrated in FIG. 7A. In addition, the transparency control menu may include a transparency control bar as a sub-menu. The transparency control bar may be managed as a main editing UI and be configured to support a detailed adjustment UI.

Figure 7E:
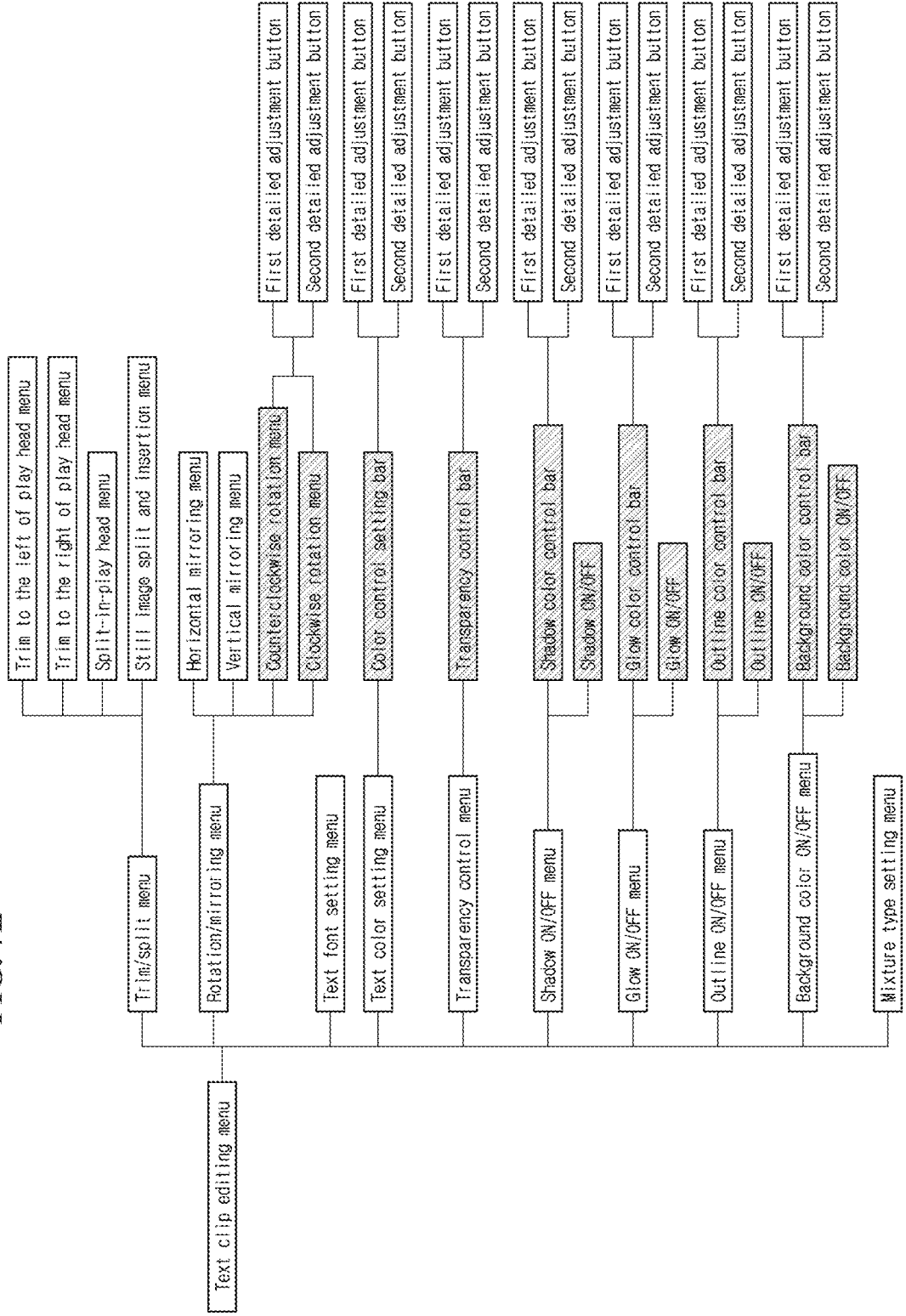

Referring to FIG. 7E, a text clip editing menu may include a text font setup menu, a text color setting menu, a trim/split menu, a transparency control menu, a rotation/mirroring control menu, a text alignment type setting menu, a shadow ON/OFF menu, a glow ON/OFF menu, an outline ON/OFF menu, a background color ON/OFF menu and a mixture type setting menu. The trim/split menu, the transparency control menu and the rotation/mirroring control menu may be configured similarly to the control menu illustrated in FIG. 7A. In addition, the shadow ON/OFF menu, the glow ON/OFF menu, the outline ON/OFF menu and the background color ON/OFF menu may each include a color control bar for setting a color (e.g., R/G/B control bar) or a transparency control bar for adjusting transparency as a sub-menu. The color control bar R/G/B control bar) or the transparency control bar may be managed as a main editing UI and be configured to support a detailed adjustment UI.

Figure 7F:
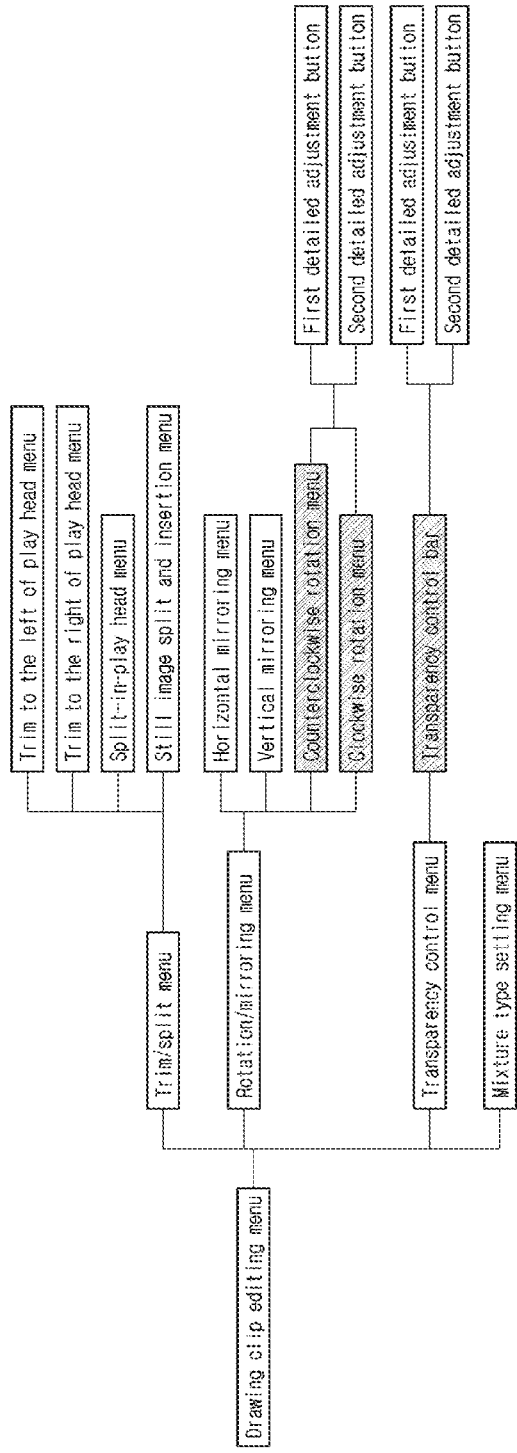

Referring to FIG. 7F, a drawing clip editing menu may include a transparency control menu, a trim/split menu, a rotation/mirroring control menu and a mixture type setting menu. The trim/split menu and the rotation/mirroring; control menu may be configured similarly to the control menu illustrated in FIG. 7D. In addition, the transparency control menu may include a transparency control bar as a sub-menu. The transparency control bar may be managed as a main editing UI and be configured to support a detailed adjustment UI.

Figure 7G:
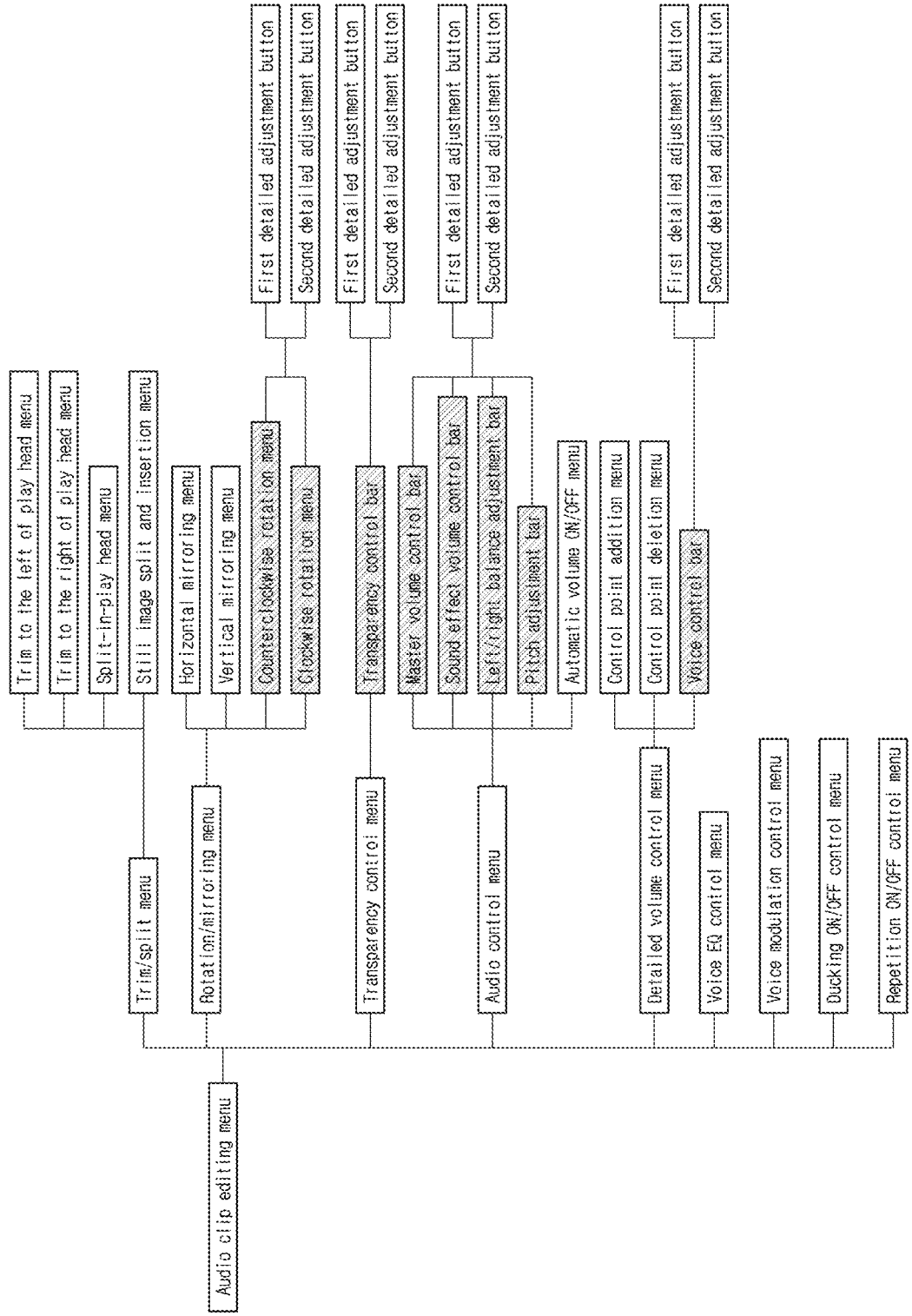

Referring to FIG. 7G, an audio clip editing menu may include an audio control menu, a voice EQ control menu, a detailed volume control menu, a voice modulation control menu, a ducking ON/OFF control menu, a repetition ON/OFF control menu and a trim/split menu. The audio control menu, the voice EQ control menu, the detailed volume control menu, the voice modulation control menu and the trim/split menu may be configured similarly to the control menu illustrated in FIG. 7A.

Figure 8:
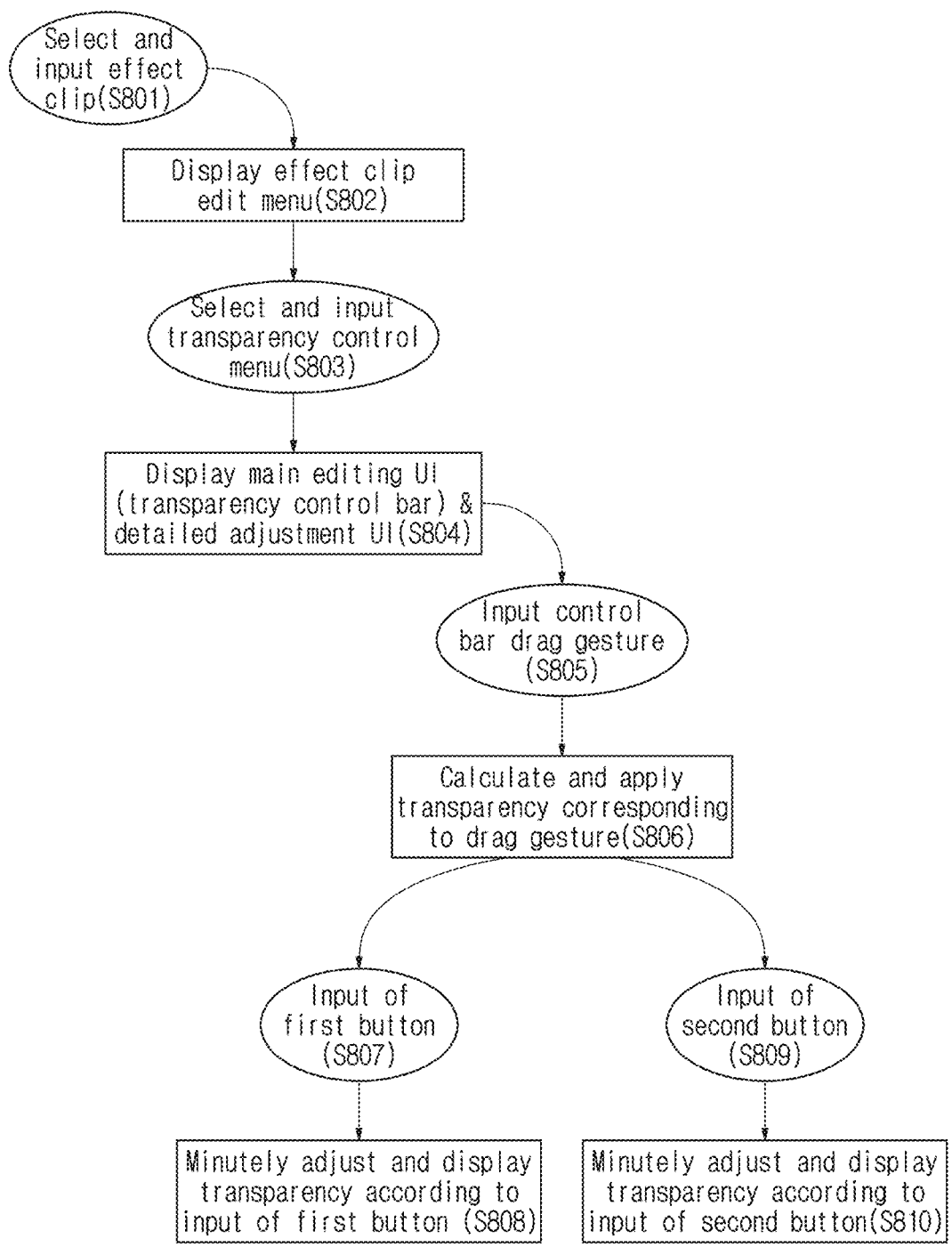
FIG. 8 is an exemplary diagram of operation in which a detailed adjustment UI is provided by a video editing UI control apparatus according to various embodiments of the present disclosure.
Figure 9A:
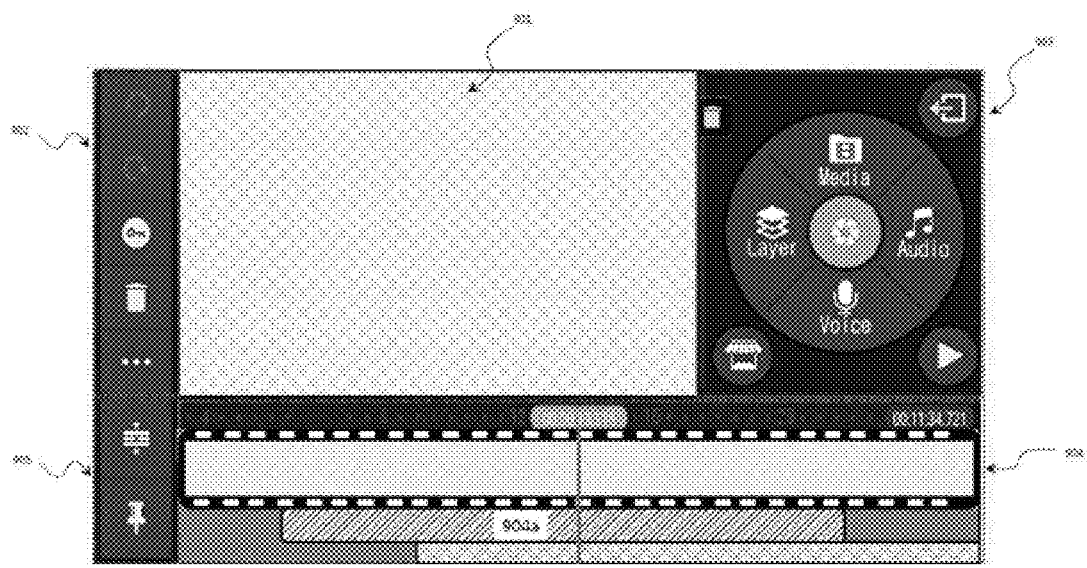
FIG. 9A to FIG. 9D are views exemplifying a UI provided in the operating process of FIG.
Figure 9B:
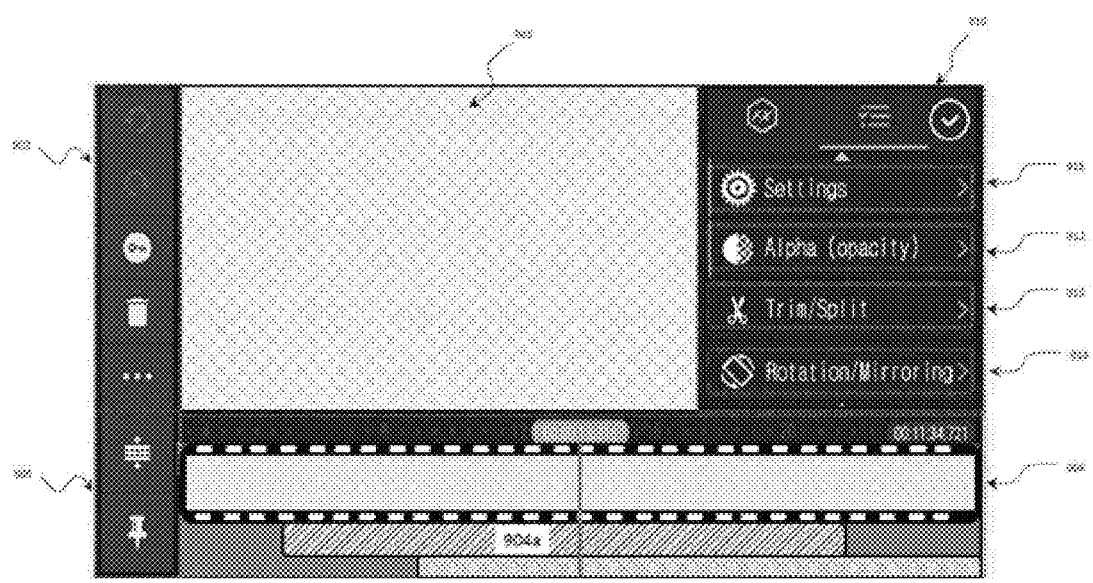
Figure 9C:
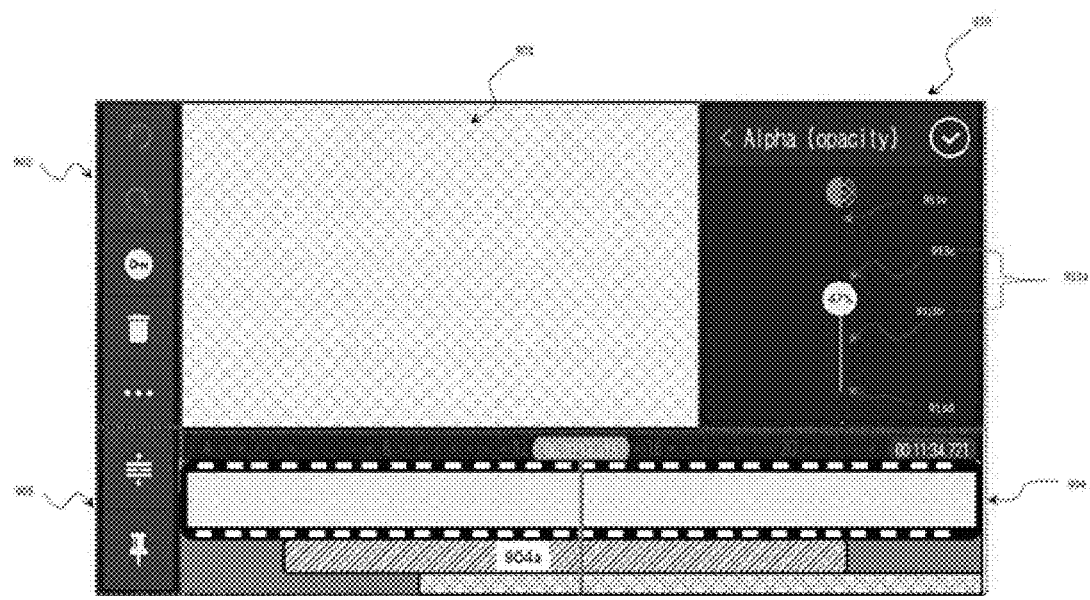
Figure 9D:
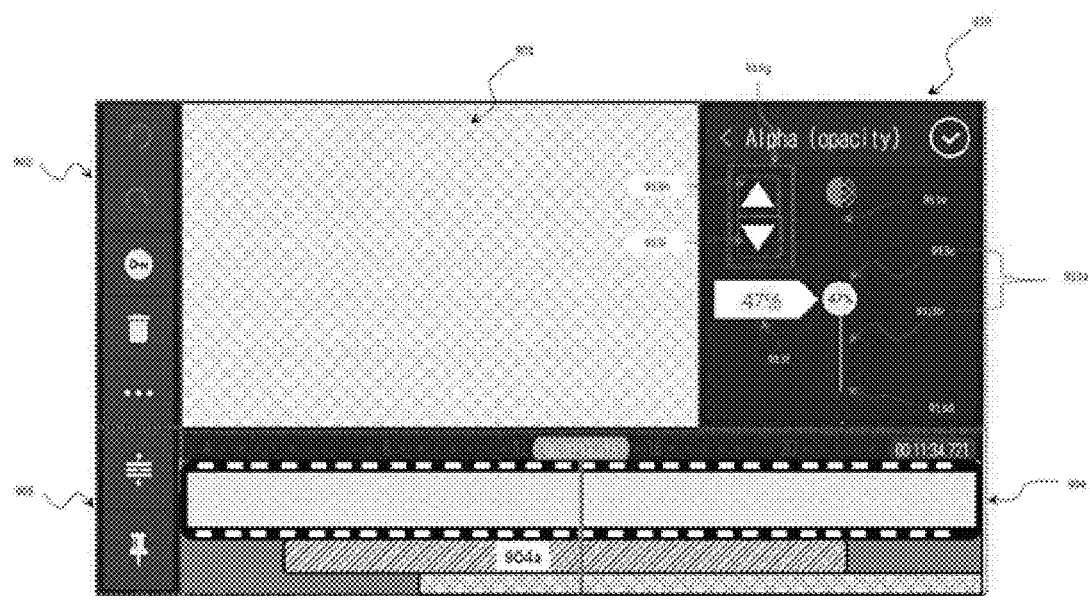

FIG. 8 is an exemplary diagram of operation in which a detailed adjustment UI is provided by a video editing UI control apparatus according to various embodiments of the present disclosure. FIGS. 9A to 9D are views exemplifying UIs provided in the operation process of FIG. 8.

First, the video editing UI control apparatus may provide a video editing UI 900 including a video display window 901, a media setting window 902, a media input window 903, a clip display window 904 and a clip setting window 905. At least one clip included in the clip display window 904 may be selected. For example, among multiple clips displayed in the clip display window 904, an effect clip 904A may be selected (S801). For example, the video editing UI control apparatus may confirm that the effect clip 904A is selected, when a touch input occurs to the effect clip 904A among multiple clips displayed in a clip display window.

In response, based on the above-described structure of the video editing; UI, the video editing UI control apparatus may confirm a UI for editing the effect clip 904A, that is, an effect clip edit menu, and display the effect clip edit menu 910 (refer to FIG. 9B) in an area of the media input window 903 (S802).

Herein, the effect clip edit menu 901 may include an effect setting menu 911, a transparency control menu 912, a trim/split menu 913 and a rotation/mirroring control menu 914.

While the effect clip edit menu 910 is shown in a display, the video editing UI control apparatus may confirm that the transparency control menu 912 is selected (S803). For example, the video editing UI control apparatus may confirm that the transparency control menu 912 is selected among menus included in the effect clip edit menu 910, when a touch input occurs in an area in which the transparency control menu 912 exists.

In response, based on the above-described structure of the video editing UI, the video editing UI control apparatus may confirm the transparency control bar 913A, which is a sub-menu of the transparency control menu 912, and configure and display the transparency control bar 913A as a main editing UI in an area in which the effect clip edit menu 910 exists (S804) The transparency control bar 913A may be configured to include a circular transparency display unit 913C moving along a vertical (or horizontal) line 913B. Transparency ranging from 0 to 100% may be displayed in the transparency display unit 913C.

The vertical (or horizontal) line 913B may have a start point 913D and an end point 913E. The vertical (or horizontal) line 913B may be configured to fill an area from the start point 913D to the transparency display unit 913C with a predetermined color.

When a drag gesture is input in an area in which the transparency display unit 913C exists or which is adjacent to the transparency display unit 913C (S805), the video editing UI control apparatus may confirm an input area of the drag gesture, calculate a transparency corresponding to the confirmed input area, apply the transparency to an effect clip and display the transparency in the transparency display unit 913C (S806). Furthermore, the video editing UI control apparatus may configure an auxiliary display unit 913F in an adjacent area to the vertical (or horizontal) line 913B and display transparency in the auxiliary display unit 913F.

In the step S804, the video editing UI control apparatus may configure and display a detailed adjustment UI 913G, while providing a main editing UI (e.g., the transparency control bar 913A).

Specifically, the video editing UI control apparatus may confirm whether or not a main editing UI supports a detailed adjustment U. As illustrated in FIG. 7C, since a main editing UI (e.g., the transparency control bar 913A) supports a detailed adjustment UI, the video editing UI control apparatus may configure and display the detailed adjustment UI.

Herein, the video editing UI control apparatus may confirm a direction of drag gesture, which is input through a main editing UI in the step S805, and set input values of the button "▲" 913H and the button "▼" 913I by considering the confirmed direction of drag gesture. For example, when a drag gesture input through a main editing UI is confirmed in the increasing direction of transparency, the video editing UI control apparatus may set an input value, which increase transparency by a predetermined unit (e.g., 1%), for the button "▲" 913H and an input value, which decreases transparency by a predetermined unit (e.g., 1%), for the button "▼" 913I. On the other hand, when a drag gesture input through a main editing UI is confirmed in the decreasing direction of transparency, the video editing UI control apparatus may set an input value, which decreases transparency by a predetermined unit (e.g., 1%), for the button "▲" 913H and an input value, which increases transparency by a predetermined unit (e.g., 1%), for the button "▼" 913I.

As another example, a detailed adjustment UI may include the button "▲" 913H and the button "▼" 913I. The button "▲" 913H may be configured to process an input with positive value, and the button "▼" 913I may be configured to process an input with negative value. Furthermore, for the button "▲" 913H and the button "▼" 913I included in the detailed adjustment UI, a different positive value and a different negative value may be applied respectively according to a main editing UI. Accordingly, the video editing UI control apparatus may set and store in advance configurations of values corresponding to the button "▲" 913H and the button "▼" 913I respectively according to each editing UI. When outputting a detailed adjustment UI, values corresponding to the button "▲" 913H and the button "▼" 913I respectively may be confirmed and applied to the button "▲" 913H and the button "▼" 913I respectively. Considering what is described above, the video editing UI control apparatus may confirm and apply corresponding values to the button "▲" 913H and the button "▼" 913I of a detailed adjustment UI. For example, the video editing UI control apparatus may be configured to confirm that, as sub-menus of the transparency control bar 913A, the button "▲" 913H operates to increase transparency by 1% and the button "▼" 913I operates to decrease transparency by 1%, and to apply theses buttons.

In an environment in which the detailed adjustment UI described above is displayed, when the button "▲" 913H is input (S807), the video editing UI control apparatus may adjust transparency by 1% according to a direction of a drag gesture, which is input through a main editing UI, and display the adjusted transparency in the transparency display unit 913C (S808). Likewise, when the button "▼" 913I is input (S809), the video editing UI control apparatus may adjust transparency by 1% according to a direction of a drag gesture, which is input through a main editing UI, and display the adjusted transparency in the transparency display unit 913C (S810).

Figure 10:
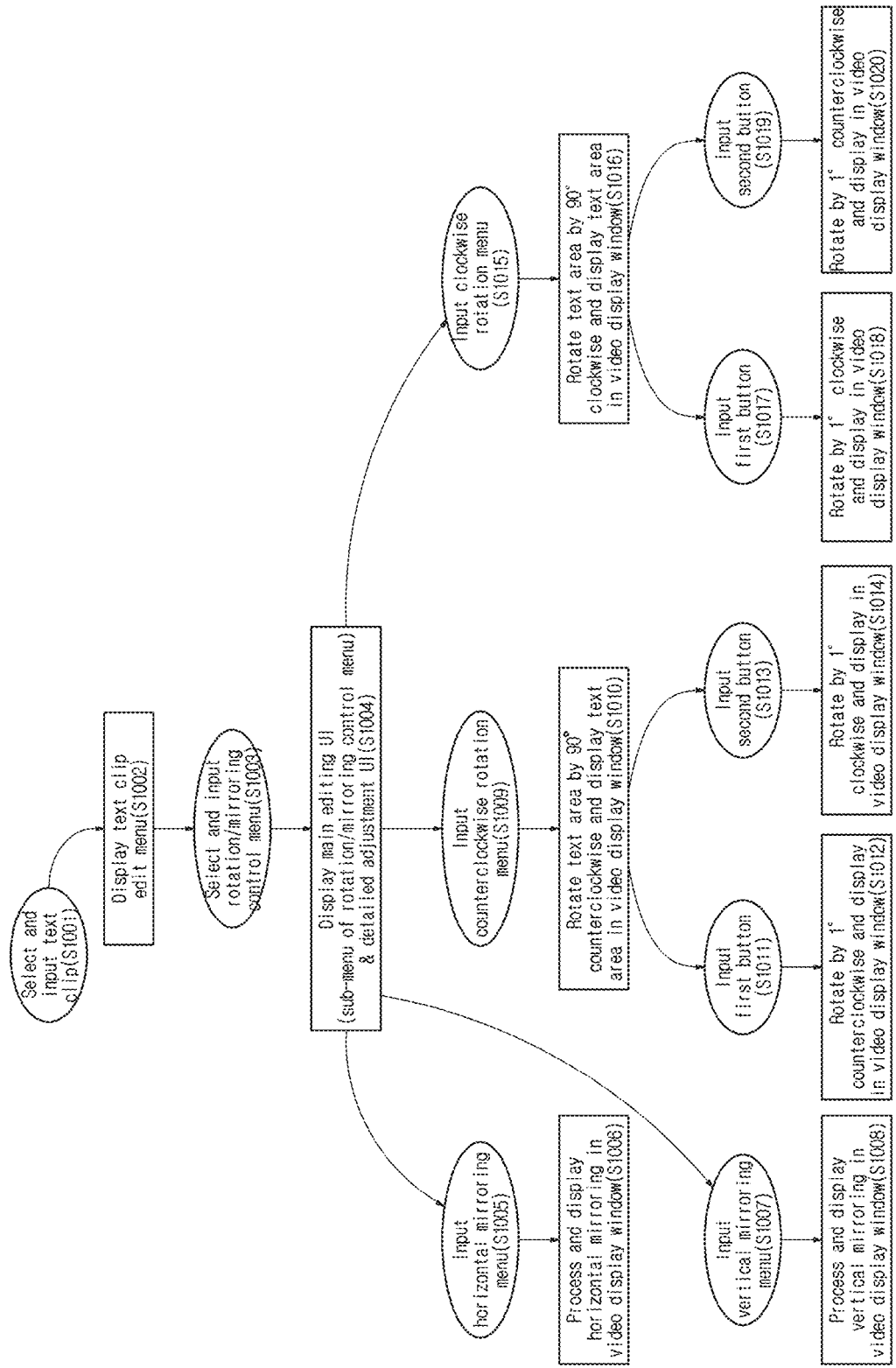
FIG. 10 is another exemplary diagram of operation in which a detailed adjustment UI is provided by a video editing UI control apparatus according to various embodiments of the present disclosure.
Figure 11A:
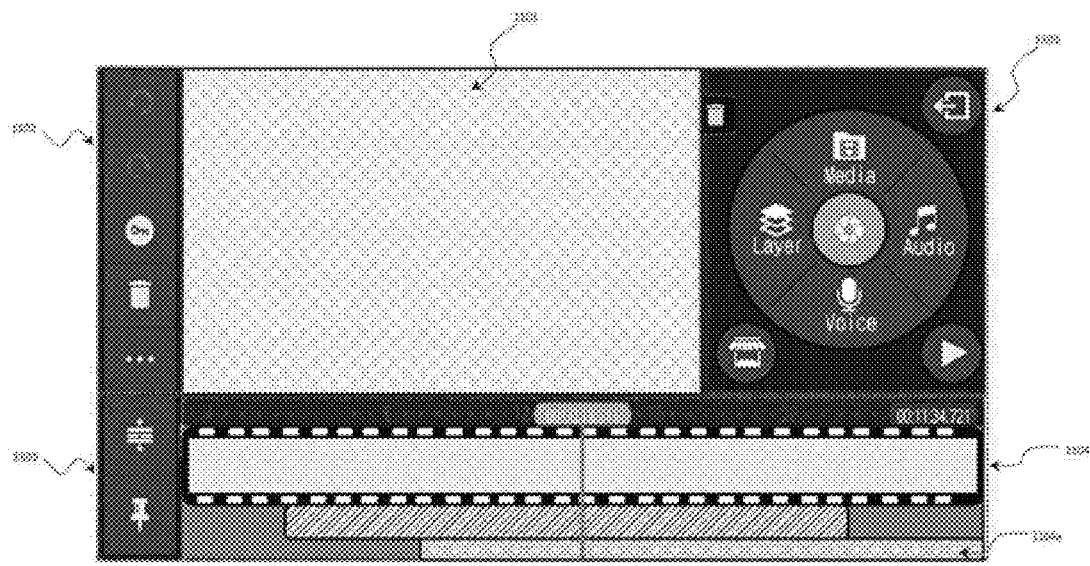
FIG. 11A to FIG. 11E are views exemplifying a UI provided in the operating process of FIG. 10.
Figure 11B:
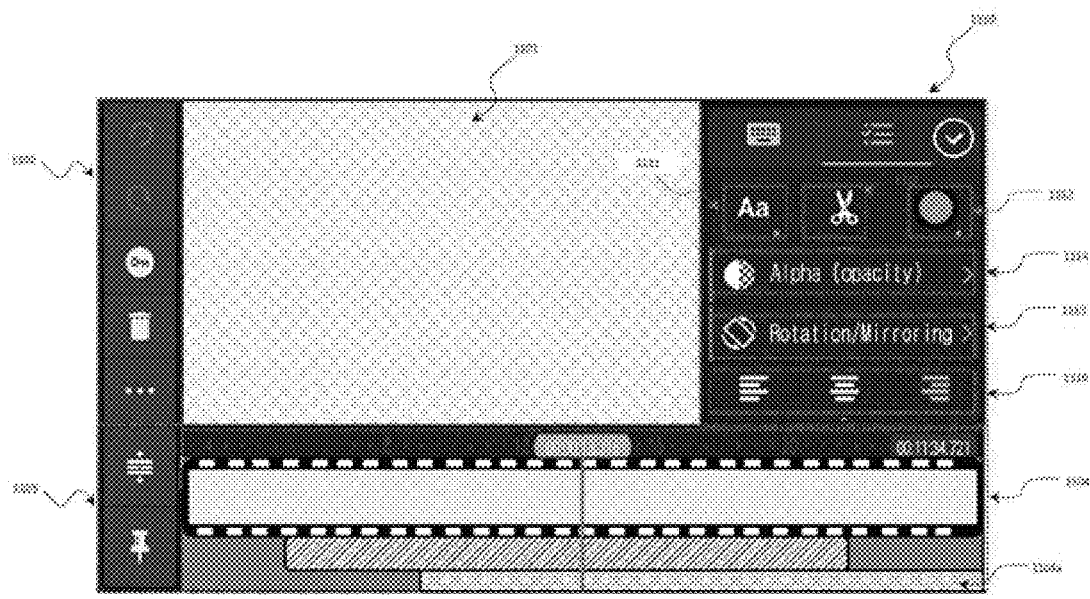
Figure 11C:
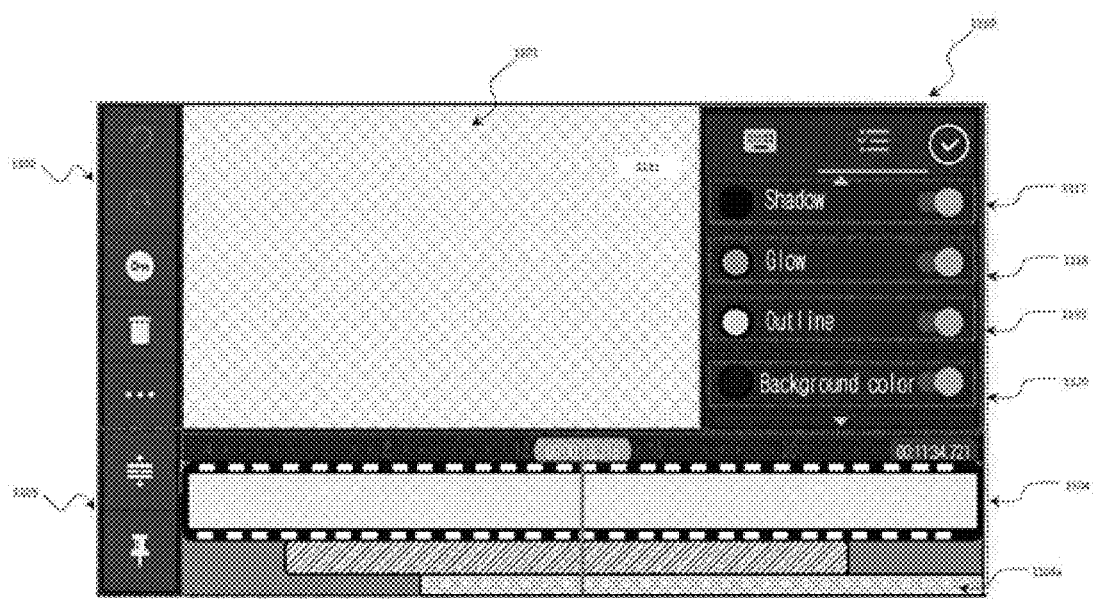
Figure 11D:
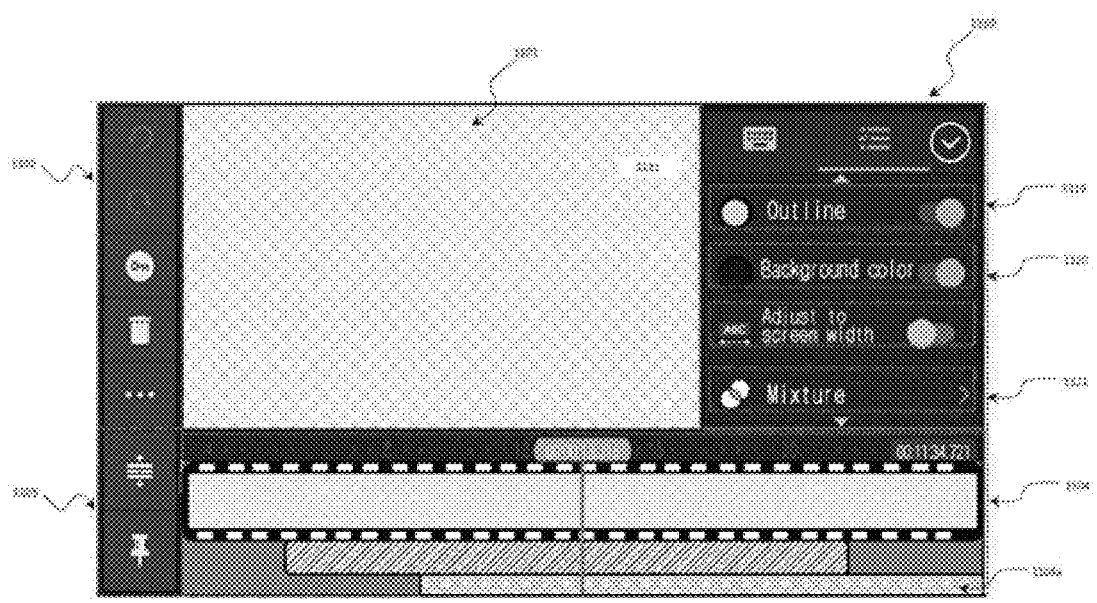
Figure 11E:
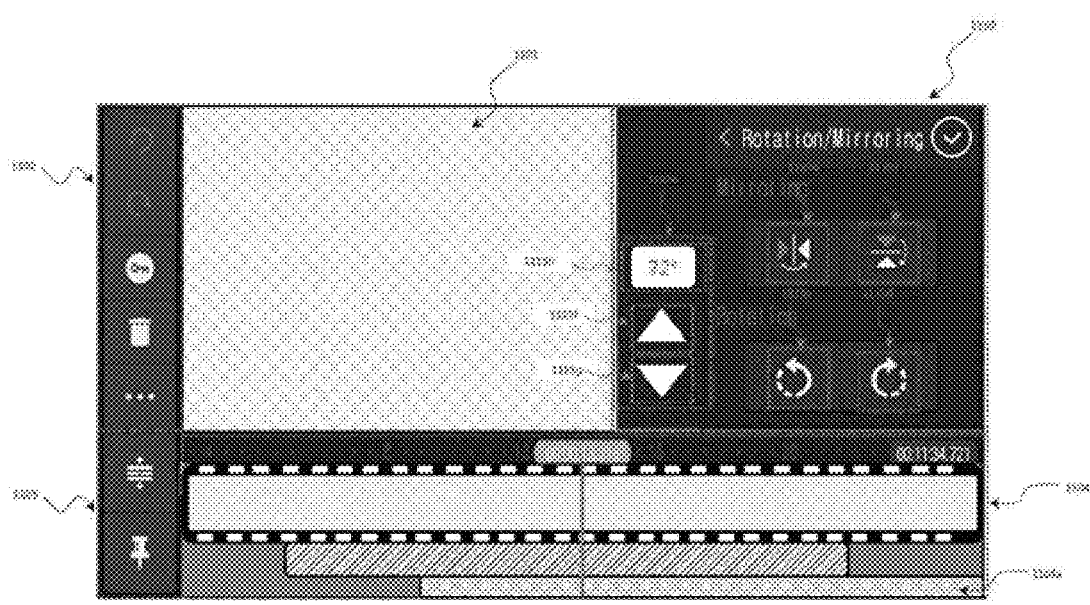

FIG. 10 is another exemplary diagram of operation in which a detailed adjustment UI is provided by a video editing UI control apparatus according to various embodiments of the present disclosure. FIGS. 11A to 11E are views exemplifying UIs provided in the operation process of FIG. 10.

First, the video editing UI control apparatus may provide a video editing UI 1100 including a video display window 1101, a media setting window 1102, a media input window 1103, a clip display window 1104 and a clip setting window 1105. At least one clip included in the clip display window 1104 may be selected. For example, among multiple clips displayed in the clip display window, a text clip 1104A may be selected (S1101). For example, the video editing UI control apparatus may confirm that the text clip 1104A is selected among multiple clips displayed in the clip display window, when a touch input occurs for over a predetermined time (e.g., 1 second)) in an area in which the text clip 1104A exists.

In response, based on the above-described structure of the video editing UI, the video editing UI control apparatus may confirm a UI for editing the text clip 1104A, that is, a text clip edit menu, and display the text clip edit menu 1110 (refer to FIG. 11B) in an area of the media input window 1103 (S1102).

Herein, the test clip edit menu 1110 may include a text font setting menu 1111, a text color setting menu 1112, a trim/split menu 1113, a transparency control menu 1114, a rotation/mirroring control menu 1115, a text alignment type setting menu 1116, a shadow ON/OFF menu 1117, a glow ON/OFF menu 1118, an outline ON/OFF menu 1119, a background color ON/OFF menu 1120, and a mixture type setting menu 1121.

While the text clip edit menu 1110 is shown in a display, the video editing UI control apparatus may confirm that the rotation/mirroring control menu 1115 is selected (S1103).

For example, the video editing UI control apparatus may confirm that the rotation/mirroring control menu 1115 is selected among menus included in the text clip edit menu 1110, when a touch input occurs for over a predetermined time (e.g., 1 second) in an area in which the rotation/mirroring control menu 1115 exists.

In response, based on the above-described structure of the video editing UI, the video editing UI control apparatus may confirm a horizontal mirroring menu 1115A, a vertical mirroring menu 1115B, a counterclockwise rotation menu 1115C and a clockwise rotation menu 1115D, which are sub-menus of the rotation/mirroring control menu 1115, as main editing UIs and configure and display the horizontal mirroring menu 1115A, the vertical mirroring menu 1115B, the counterclockwise rotation menu 11150 and the clockwise rotation menu 1115D in a corresponding area (S1004). Herein, the video editing UI control apparatus may configure and display a detailed adjustment UI 1115E, while providing a main editing UI.

When an input is confirmed in an area in which the horizontal mirroring menu 1115A exists or in an area adjacent to the horizontal mirroring menu 1115A (S1005), the video editing UI apparatus may perform mirroring of a text object in the horizontal direction and display the text object in the video display window 1101 (S1006). Likewise, when an input is confirmed in an area in which the vertical mirroring menu 1115B exists or in an area adjacent to the horizontal mirroring menu 1115B (S1007), the video editing UI apparatus may perform mirroring of a text object in the vertical direction and display the text object in the video display window 1101 (S1008).

The counterclockwise rotation menu 11150 may consist of a button indicating counterclockwise rotation of a text area. When an input is confirmed in an area in which the counterclockwise rotation menu 1115C exists or in an area adjacent to the counterclockwise rotation menu 1115C (S1009), the video editing UI control apparatus may rotate the text area 90 degrees counterclockwise and display the rotated text area in the video display window 1101 (S1010).

Here, in response to the input of the counterclockwise rotation menu 11150, the video editing UI control apparatus may set input values of the button "▲" 1115E and the button "▼" 1115G respectively. For example, the video editing UI control apparatus may set a counterclockwise rotation by a predetermined unit (e.g., 1) for the button "▲" 1115F and a clockwise rotation by a predetermined unit (e.g., 1) for the button "▼" 1115G.

In an environment in which the detailed adjustment UI described above is displayed, when the button "▲" 1115F is input (S1011), the video editing UI control apparatus may rotate a text area counterclockwise by 1% and display the text in the video display window 1101 (S1012). In addition, when the button "▼" 1115G is input (S1013), the video editing UI control apparatus may rotate a text area clockwise by 1% and display the text in the video display window 1101 (S1014).

Likewise, the clockwise rotation menu 1115D may consist of a button indicating clockwise rotation of a text area. When an input is confirmed in an area in which the clockwise rotation menu 1115D exists or in an area adjacent to the clockwise rotation menu 1115D (S1015), the video editing UI control apparatus may rotate the text area 90 degrees clockwise and display the rotated text area in the video display window 1101 (S1016).

Here, in response to the input of the clockwise rotation menu 1115D, the video editing UI control apparatus may set input values of the button "▲" 1115F and the button "▼"

1115G respectively. For example, the video editing UI control apparatus may set a clockwise rotation by a predetermined unit (e.g., 1) for the button "▲" 1115F and a counterclockwise rotation by a predetermined unit (e.g., 1) for the button "▼" 1115G.

In an environment in which the detailed adjustment UI described above is displayed, when the button "▲" 1115F is input (S1011), the video editing U control apparatus may rotate a text area clockwise by 1° and display the text in the video display window 1101 (S1018). In addition, when the button "▼" 1115G is input (S1019), the video editing UI control apparatus may rotate a text area clockwise by 1° and display the text in the video display window 1101 (S1020).

As another example, in a detailed adjustment UI, the button "▲" 1115F may be configured to process an input with positive value, and the button "▼" 1115G may be configured to process an input with negative value. Considering what is described above, the video editing UI control apparatus may confirm and apply corresponding values to the button "▲" 1115F and the button "▼" 1115G of a detailed adjustment UI of the counterclockwise rotation menu 1115C. For example, the video editing UI control apparatus may be configured to confirm that, as sub-menus of the counterclockwise rotation menu 1115C, the button "▲" 1115F operates to rotate a text area counterclockwise by 1° and the button "▼" 1115G operates to rotate a text area clockwise by 1°, and to apply theses buttons.

Furthermore, the detailed adjustment UI 1115E may further a rotation angle display unit 1115H displaying a rotation angle by reflecting values that are input through the button "▲" 1115F and the button "▼" 1115G. Herein, the rotation angle display unit 1115H may be displayed close to the button "▲" 1115F and the button "▼" 1115G.

Preferably, the detailed adjustment UI 1115E may be displayed in an area close to the counterclockwise rotation menu 1115C or the clockwise rotation menu 1115D. Although, in an embodiment of the present disclosure, the detailed adjustment UI 1115E is displayed in an area close to the counterclockwise rotation menu 1115C or the clockwise rotation menu 1115D, the present disclosure is not limited to the embodiment, which may be modified in various ways. For example, a detailed adjustment UI may be displayed in an area of the video display window 1101 or be displayed sequentially in response to an input of a main editing UI. For example, when a touch input occurs for over a predetermined time (e.g., 1 second) in a main editing UI, a detailed adjustment UI may be configured and displayed.

The exemplary methods described herein were expressed by a series of operations for clear description, but it does not limit the order of performing the steps, and if necessary, the steps may be performed simultaneously or in different orders. In order to achieve the method of the present disclosure, other steps may be added to the exemplary steps, or the other steps except for some steps may be included, or additional other steps except for some steps may be included.

Various embodiments described herein are provided to not arrange all available combinations, but explain a representative aspect of the present disclosure and the configurations about the embodiments may be applied individually or in combinations of at least two of them.

Further, various embodiments of the present disclosure may be implemented by hardware, firmware, software, or combinations thereof. When hardware is used, the hardware may be implemented by at least one of ASICs (Application Specific Integrated Circuits), DSPs (Digital Signal Processors), DSPDs (Digital Signal Processing Devices), PLDs (Programmable Logic Devices), FPGAs (Field Programmable Gate Arrays), a general processor, a controller, a micro controller, and a micro-processor.

The scope of the present disclosure includes software and device-executable commands (for example, an operating system, applications, firmware, programs) that make the method of the various embodiments of the present disclosure executable on a machine or a computer, and non-transitory computer-readable media that keeps the software or commands and can be executed on a device or a computer.

What is claimed is:

1. A video editing UI control apparatus, the apparatus comprising:
   an editing UI display unit;
   a user input confirmation unit;
   an editing UI processing unit; and
   one or more processors and memory storing instructions that, when executed by the one or more processors, cause the video editing UI control apparatus to carry out operations of the editing UI display unit, the user input confirmation unit, and the editing UI processing unit,
   wherein the operations of the editing UI display unit include:
   displaying on a display device an editing UI comprising a main editing UI;
   wherein the operations of the user input confirmation unit include:
   determining user input information based on a user input that is provided as a touch input through the display device;
   and wherein the operations of the editing UI processing unit include:
   determining an object corresponding to the user input information;
   determining a main editing input value for editing the object corresponding to the user input information;
   checking whether or not the main editing UI supports a detailed adjustment UI, wherein the main editing UI is an upper layer menu of a menu layer of the detailed adjustment UI;
   responsive to confirming that the main editing UI supports the detailed adjustment UI, displaying the detailed adjustment UI, wherein the editing UI further comprises the detailed adjustment UI;
   setting a detailed adjustment input value of the detailed adjustment UI by considering the determined main editing input value; and
   processing the object considering the detailed adjustment input value.

2. The video editing UI control apparatus of claim 1,
   wherein the main editing input value comprises a direction and size of a drag input that is input through the main editing UI.

3. The video editing UI control apparatus of claim 2,
   wherein the detailed adjustment UI comprises a first button and a second button with a fixed form,
   wherein the first button is set to process an input in a predetermined size unit corresponding a direction of the drag input, and
   wherein the second button is set to process an input in the predetermined size unit corresponding to an opposite direction of the drag input.

4. The video editing UI control apparatus of claim 1,
   wherein the detailed adjustment UI comprises a first button and a second button with a fixed form, wherein the first button is set to process a positive input in a predetermined size unit, and wherein the second button is set to process a negative input in the predetermined size unit.

5. The video editing UI control apparatus of claim 3, wherein the editing UI processing unit determines user input information that is input while the first button and the second button are displayed, and wherein the operations of the editing UI processing unit further include determining a detailed adjustment input value corresponding to the user input information and applies the detailed adjustment value to video editing.

6. The video editing UI control apparatus of claim 5, wherein the detailed adjustment UI further comprises a detailed adjustment value display unit for displaying the detailed adjustment input value.

7. The video editing UI control apparatus of claim 5, wherein the detailed adjustment value comprises a size of adjustment value according to an input of the first and second buttons and a type of adjustment value that is processed by means of an input of the first and second buttons of the detailed adjustment UI.

8. The video editing UI control apparatus of claim 1, wherein displaying the detailed adjustment UI responsive to confirming that the main editing UI supports the detailed adjustment UI comprises requesting the editing UI display unit to display the detailed adjustment UI responsive to the confirmation.

9. The video editing UI control apparatus of claim 1, wherein the detailed adjustment UI is displayed in an area adjacent to the object as displayed in a video display window.

10. A video editing UI control method, the method comprising:

displaying an editing UI comprising a main editing UI in a display device;

determining user input information based on a user input that is provided through a touch input in the display device;

determining an object corresponding to the user input information;

determining a main editing input value for editing the object corresponding to the user input information;

checking whether or not the main editing UI supports a detailed adjustment UI, wherein the main editing UI is an upper layer menu of a menu layer of the detailed adjustment UI;

responsive to confirming that the main editing UI supports the detailed adjustment UI, displaying the detailed adjustment UI, wherein the editing UI further comprises the detailed adjustment UI;

setting a detailed adjustment input value of the detailed adjustment UI by considering the determined main editing input value; and processing, the object considering the detailed adjustment input value.

11. The video editing UI control method of claim 10, wherein setting the detailed adjustment input value of the detailed adjustment UI comprises determining the main editing input value comprising a direction and size of a drag input that is input through the main editing UI.

12. The video editing UI control method of claim 11, wherein the detailed adjustment UI comprises a first button and a second button with a fixed form, and wherein setting the detailed adjustment input value of the detailed adjustment UI further comprises setting the first button to process an input in a predetermined size unit corresponding to a direction of the drag input and the second button to process an input in the predetermined size unit corresponding to an opposite direction of the drag input.

13. The video editing UI control method of claim 10, wherein the detailed adjustment UI comprises a first button and a second button with a fixed form, and wherein setting the detailed adjustment input value of the detailed adjustment UI comprises setting the first button to process a positive input value in a predetermined size unit and the second button to process a negative input value in the predetermined size unit.

14. The video editing UI control method of claim 10, wherein processing the object considering the detailed adjustment input value comprises:

determining user input information that is input while the first button and the second button are displayed; and determining the detailed adjustment input value corresponding to the user input information and applying the detailed adjustment input value to video editing.

15. The video editing UI control method of claim 14, wherein processing the object considering the detailed adjustment input value comprises configuring the detailed adjustment UI comprising a detailed adjustment value display unit for displaying the detailed adjustment input value.

16. The video editing UI control method of claim 14, wherein the detailed adjustment input value comprises a size of adjustment value according to an input of the first and second buttons and a type of adjustment value that is processed by means of an input of the first and second buttons.

17. The video editing UI control method of claim 10, wherein displaying the a detailed adjustment UI comprises displaying the detailed adjustment UI in an area adjacent to the object as displayed in a video display window.

* * * * *